G. H. DICKERSON AND A. VANDERVELD.
LUMBER JOINING MACHINE.
APPLICATION FILED NOV. 2, 1920.

1,420,976. Patented June 27, 1922.
26 SHEETS—SHEET 4.

Inventors
Glenn H. Dickerson
Anthony Vanderveld
By Frank E. Liverance Jr.
Attorney

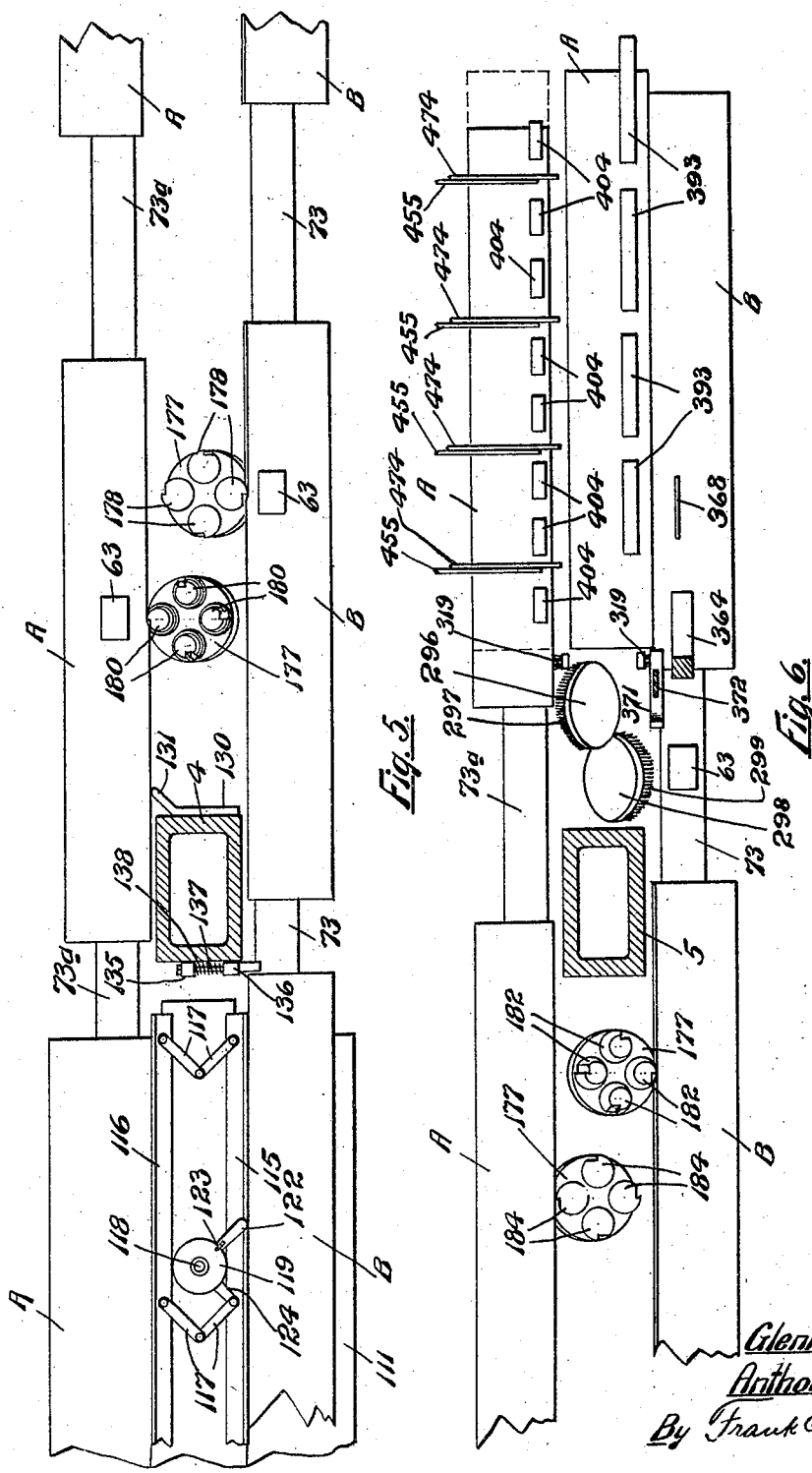

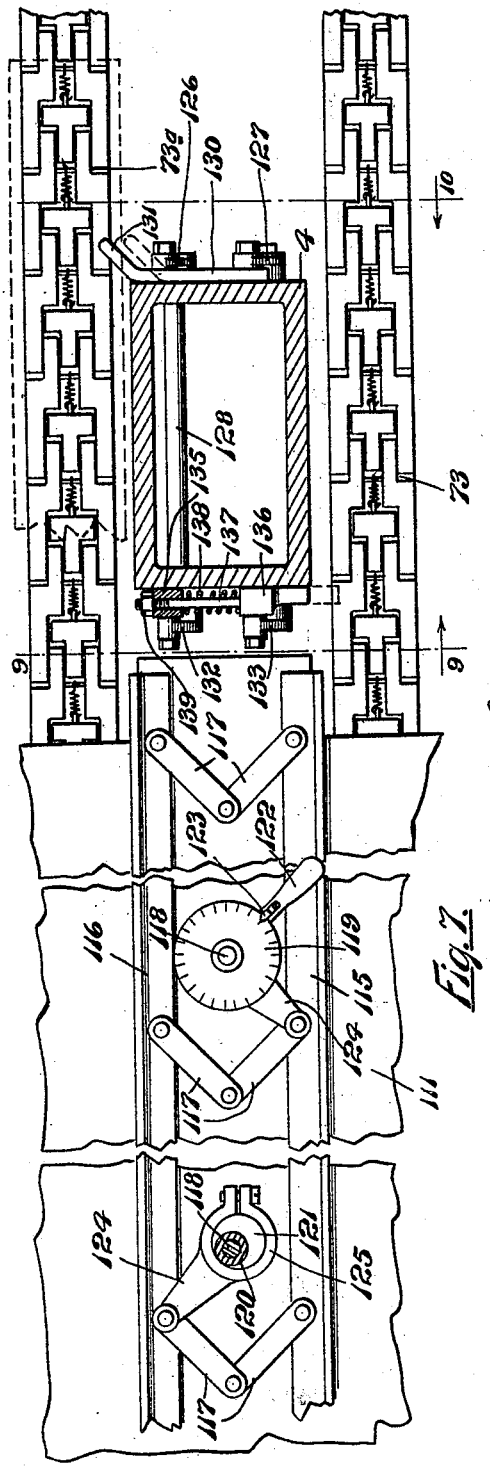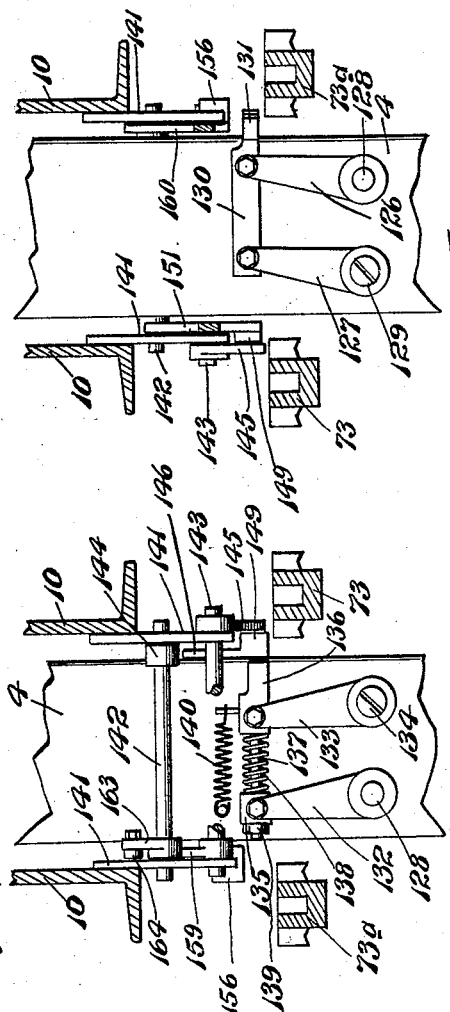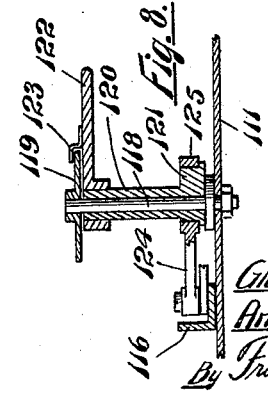

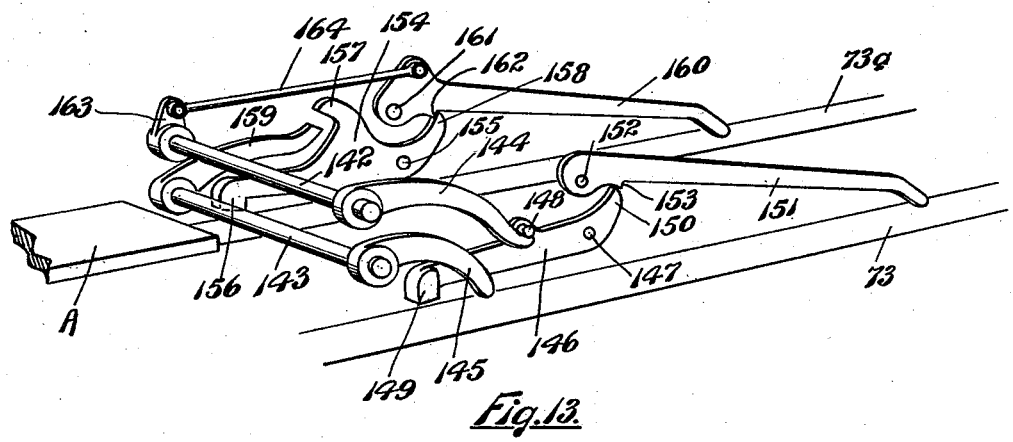
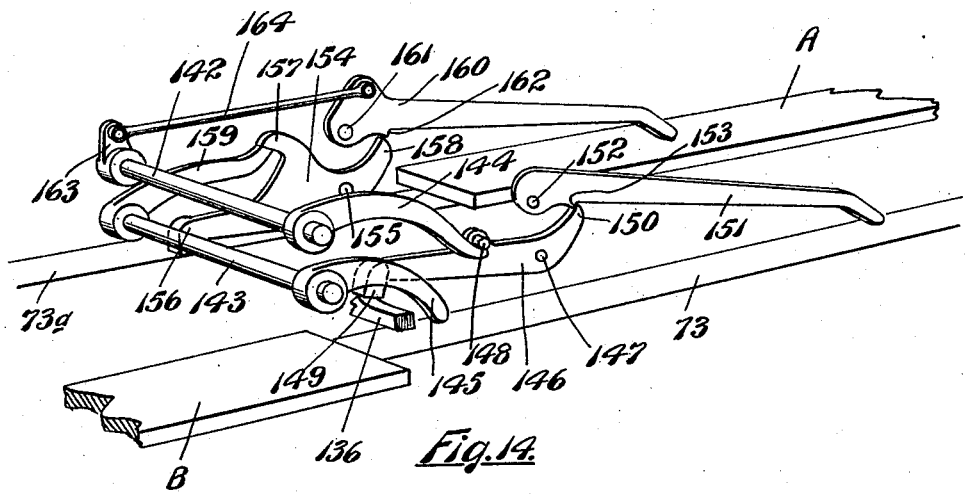

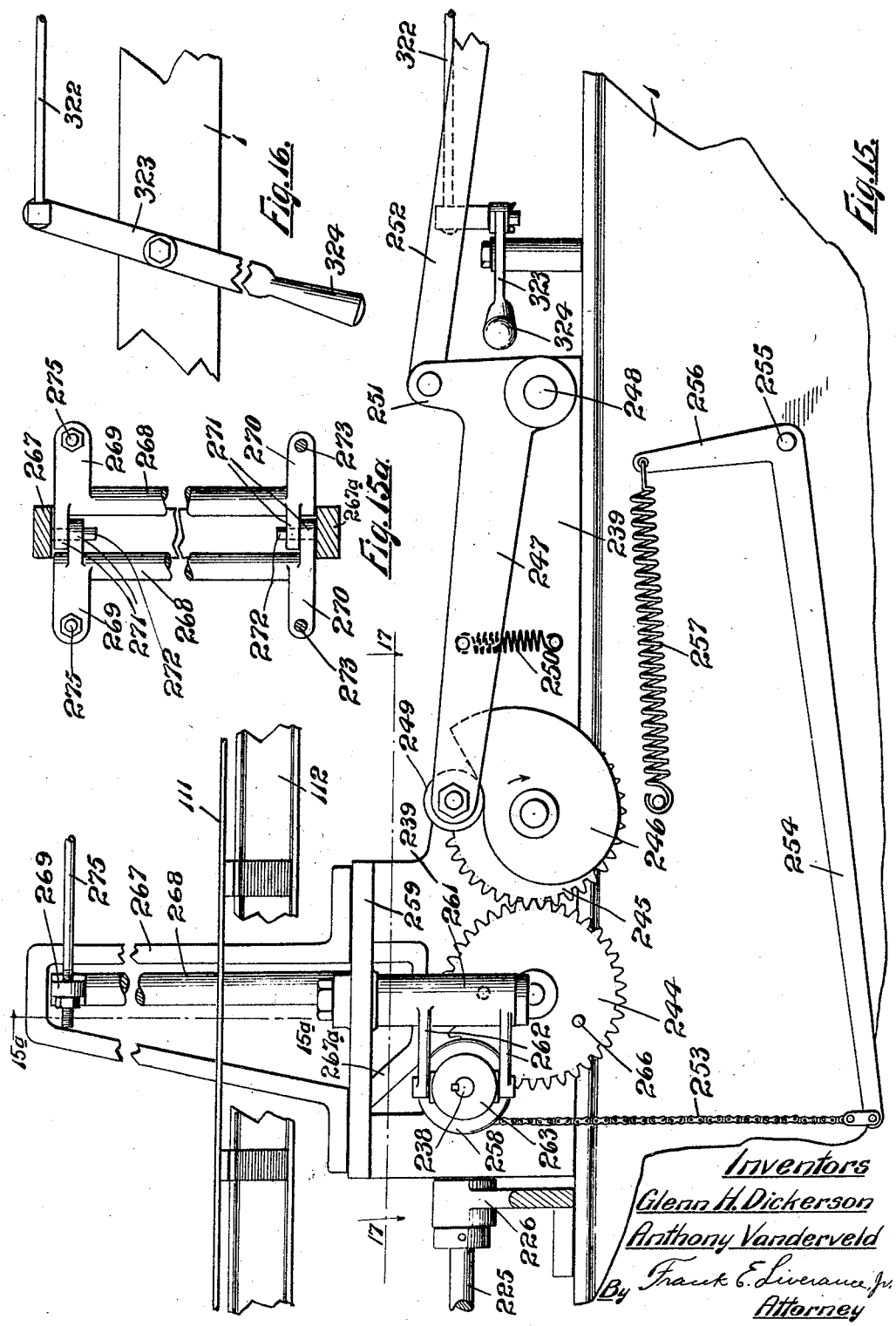

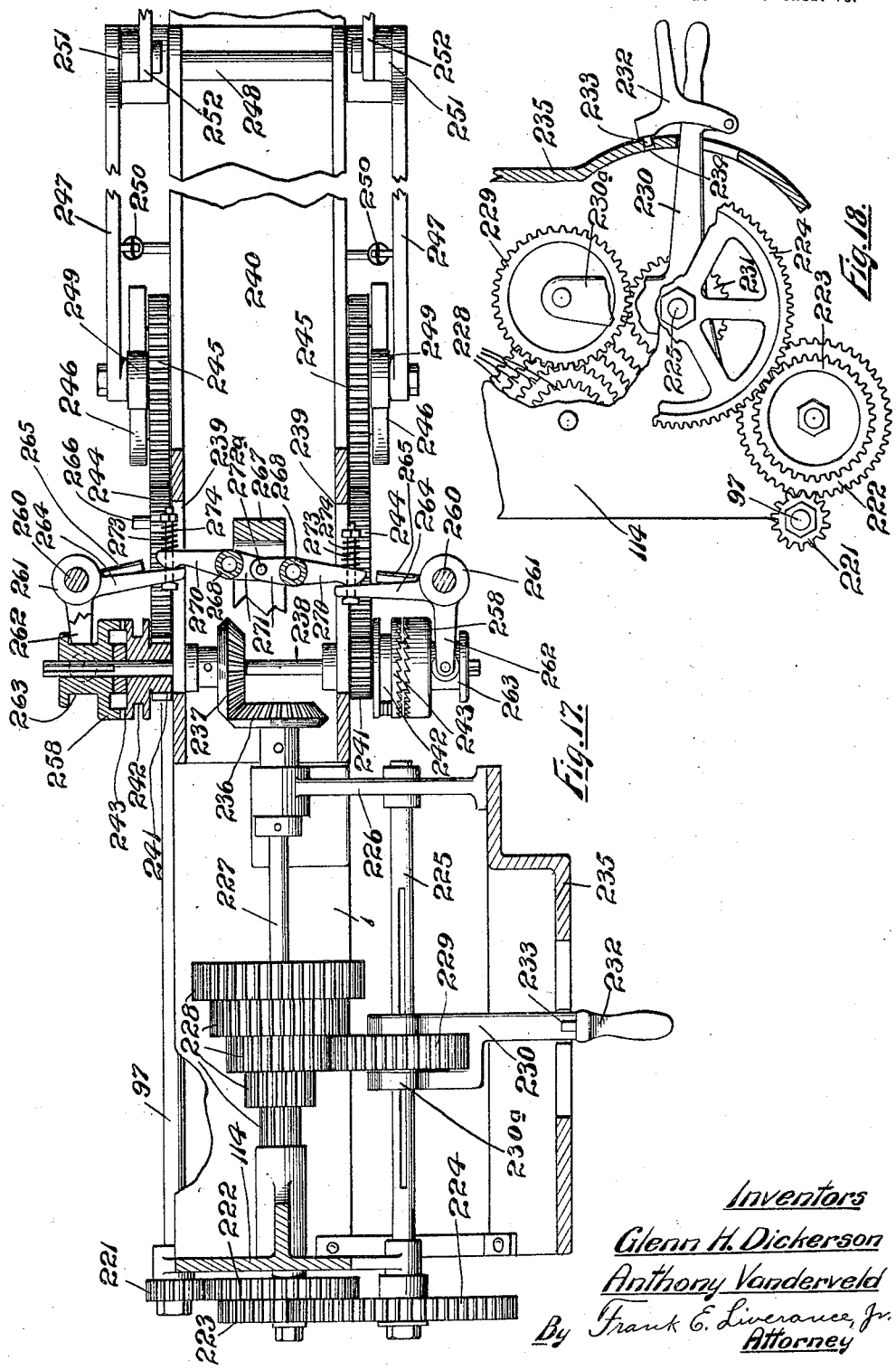

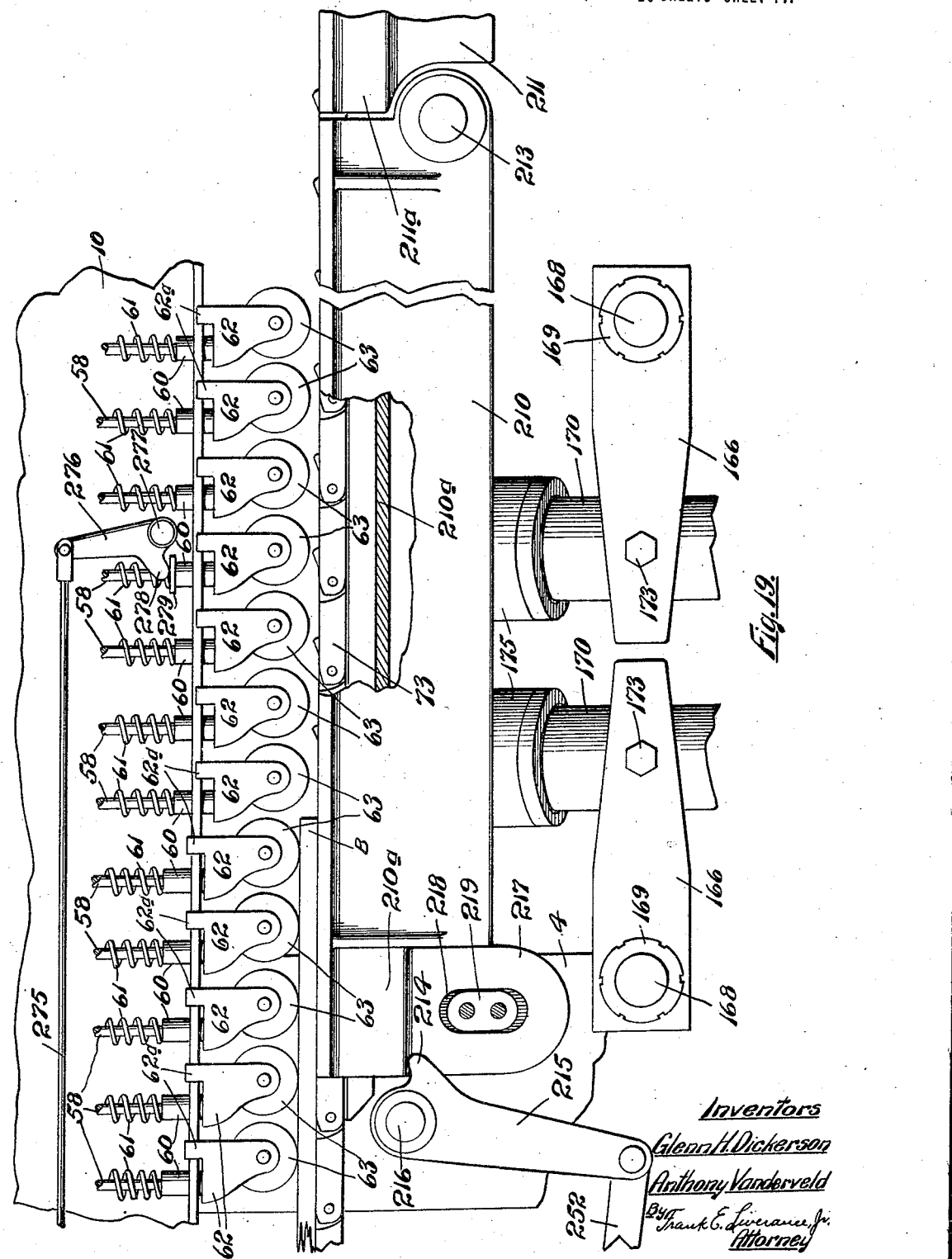

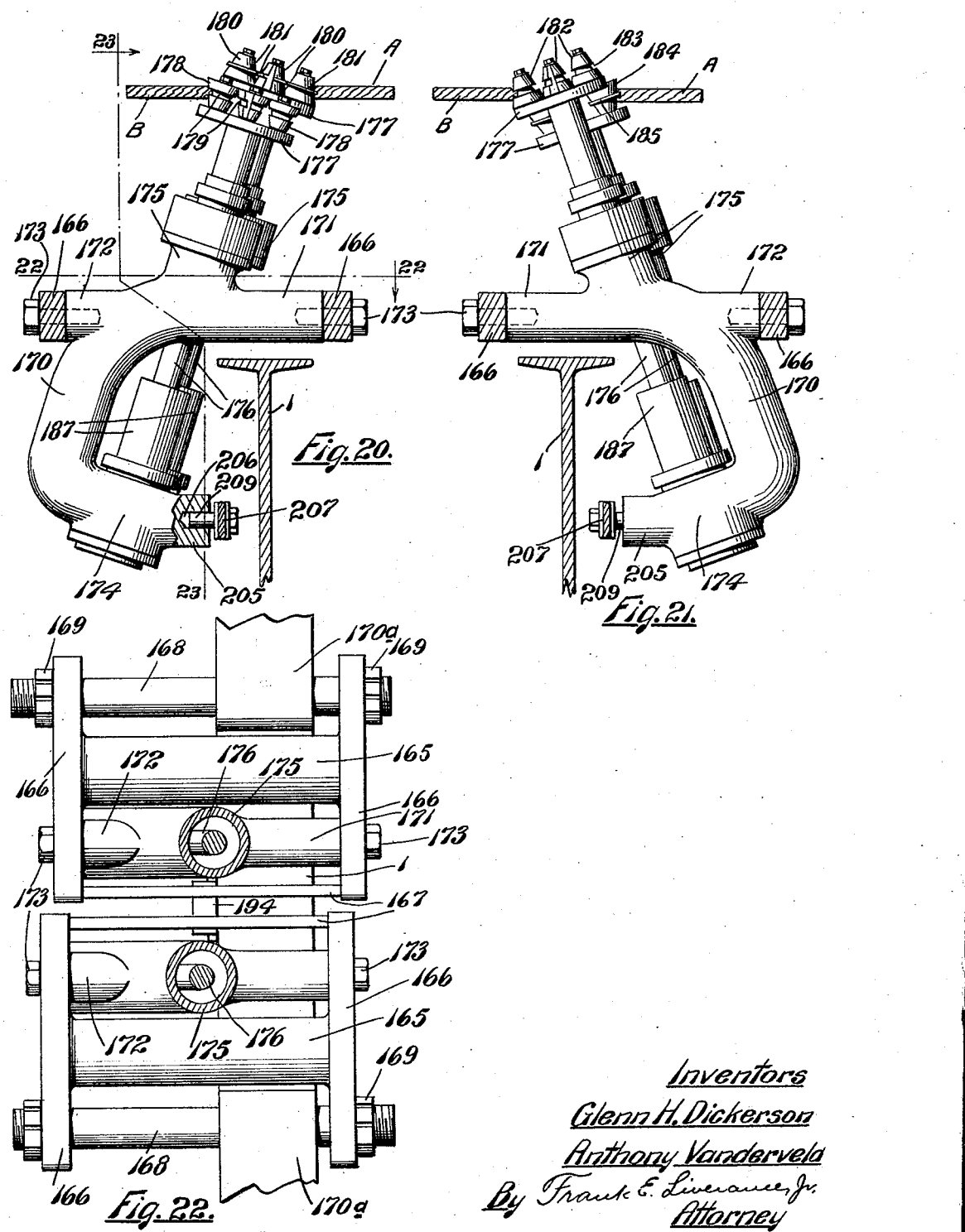

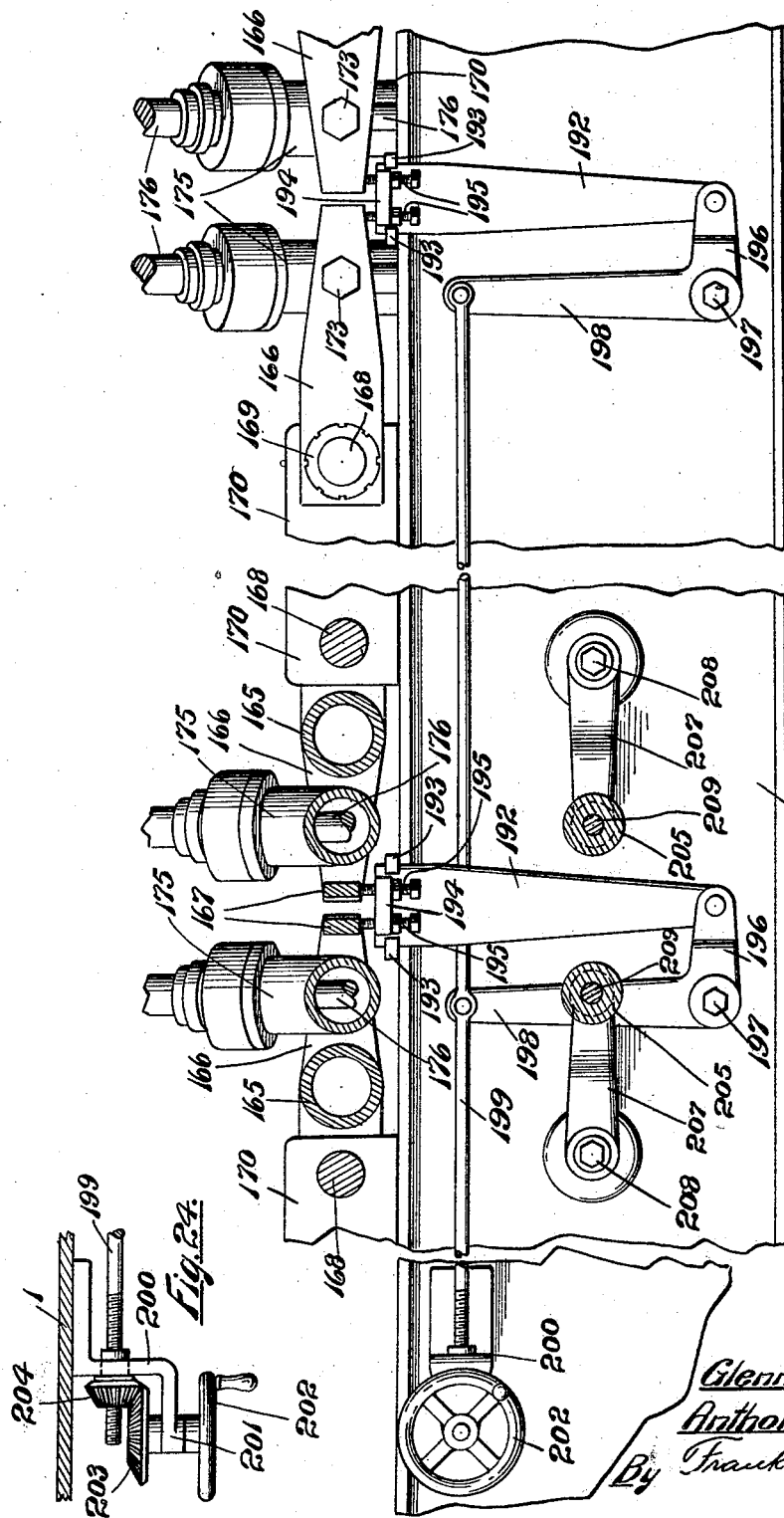

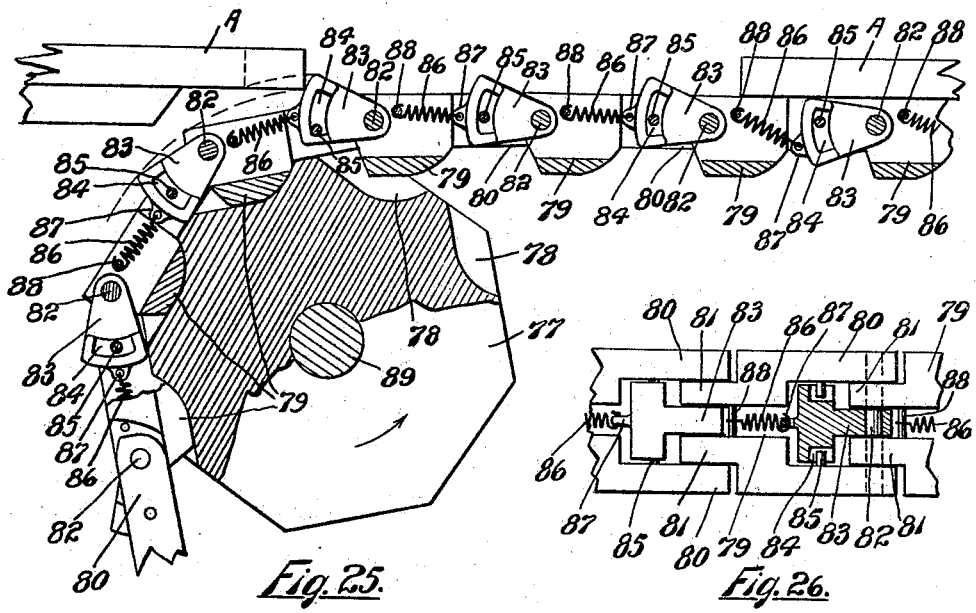
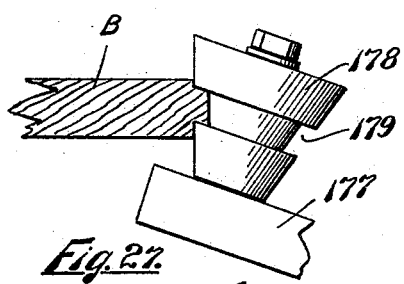
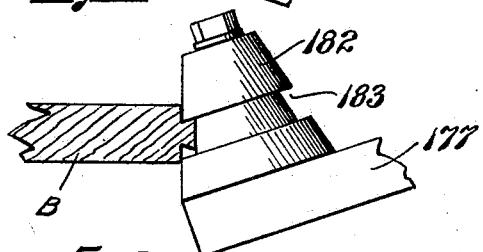
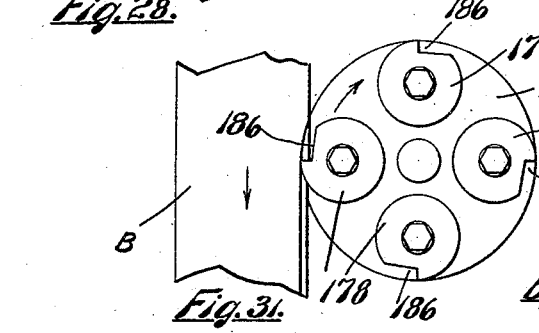

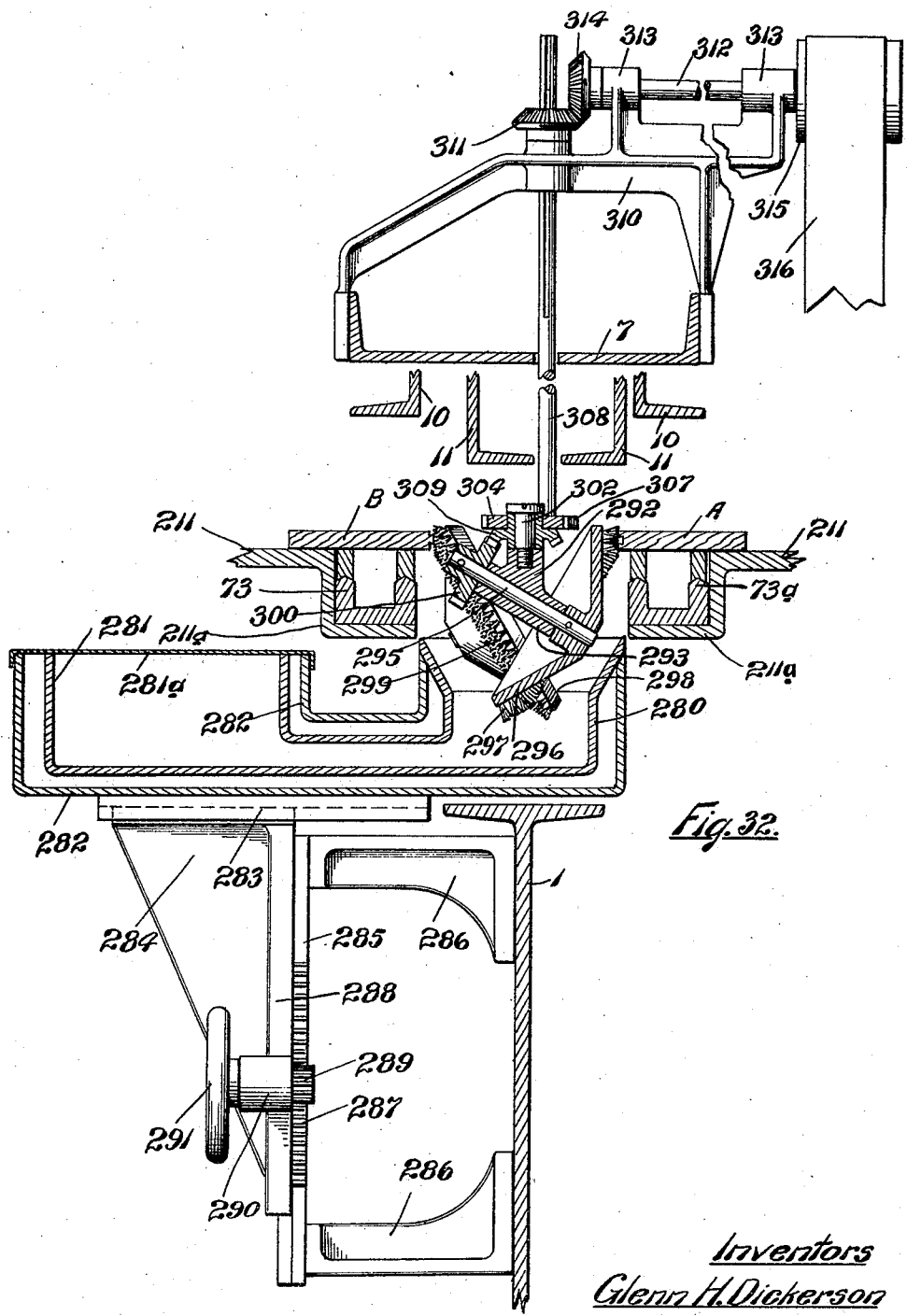

G. H. DICKERSON AND A. VANDERVELD.
LUMBER JOINING MACHINE.
APPLICATION FILED NOV. 2, 1920.
1,420,976.
Patented June 27, 1922.
26 SHEETS—SHEET 16.
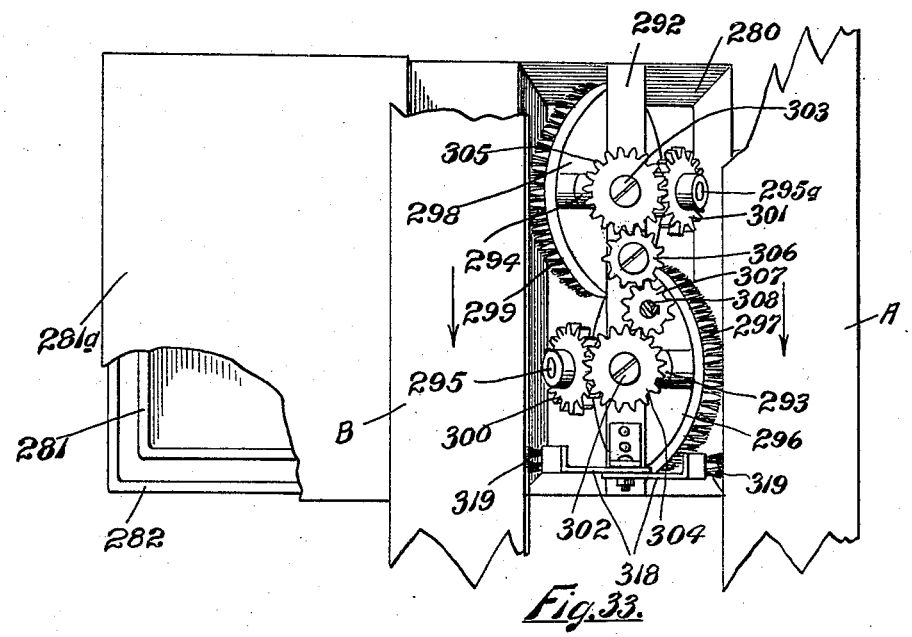
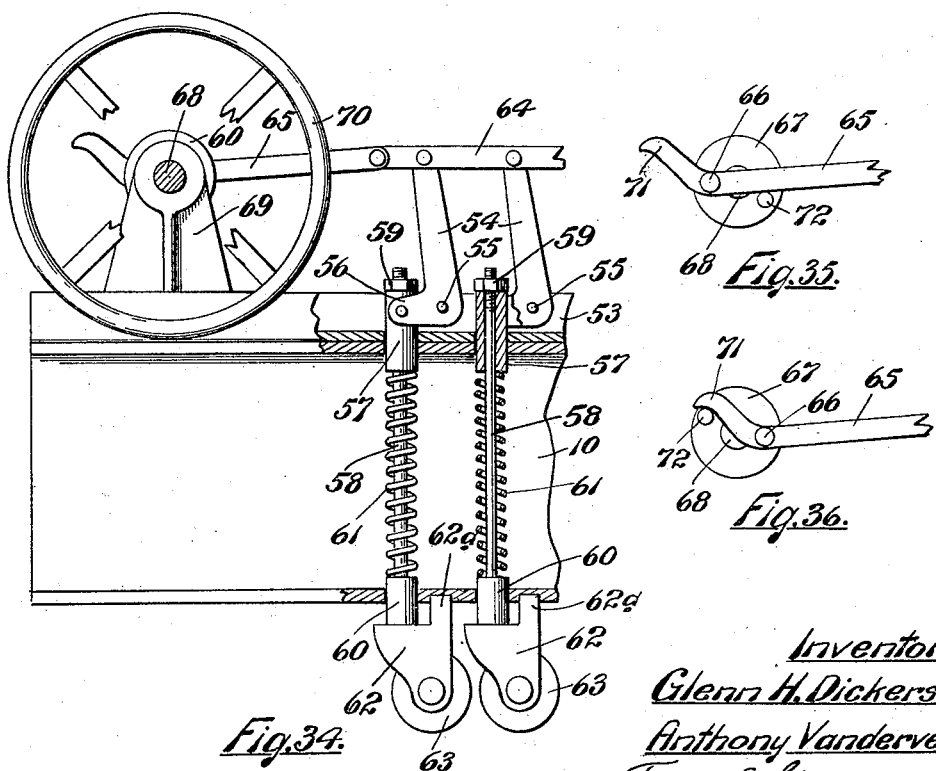

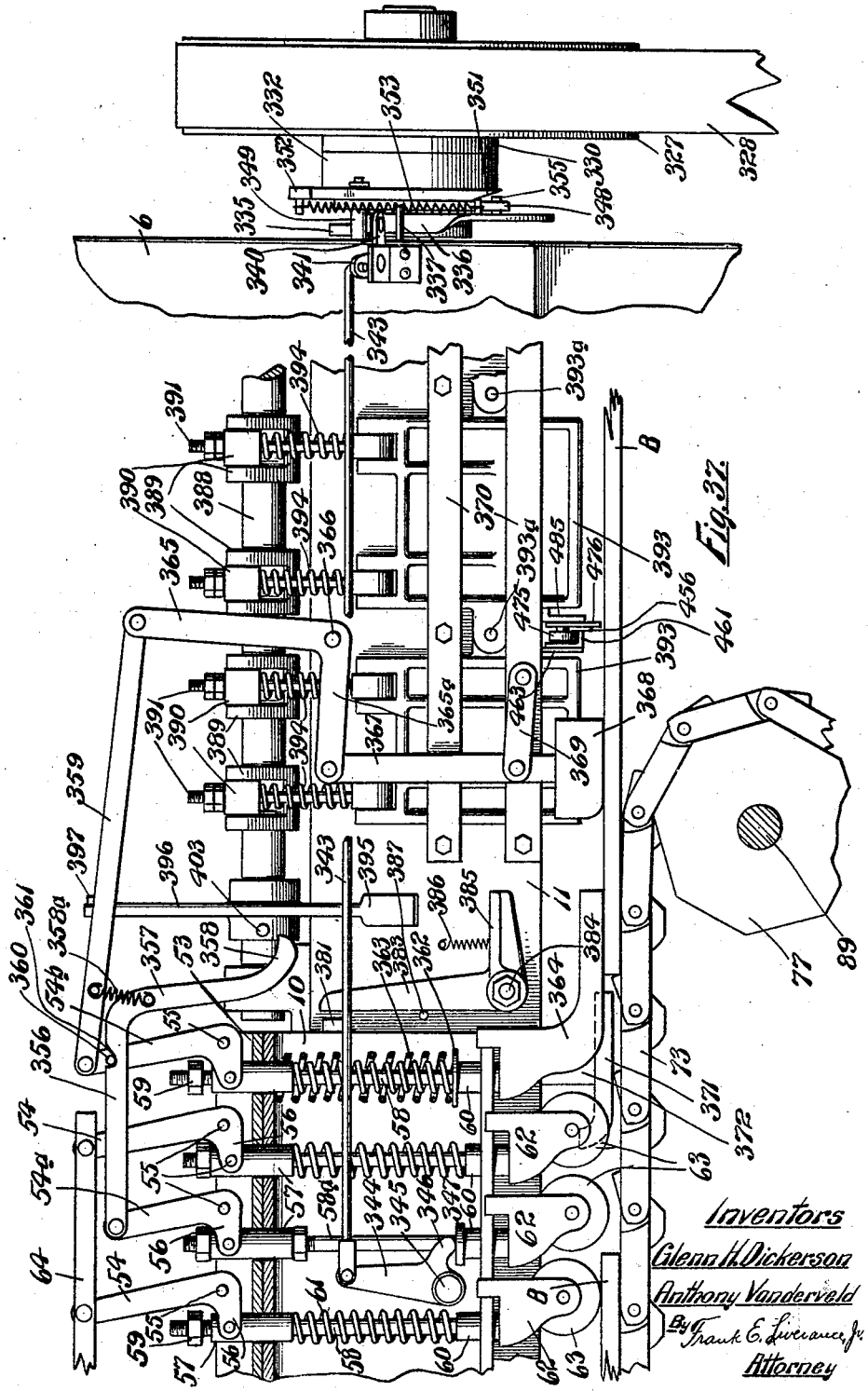

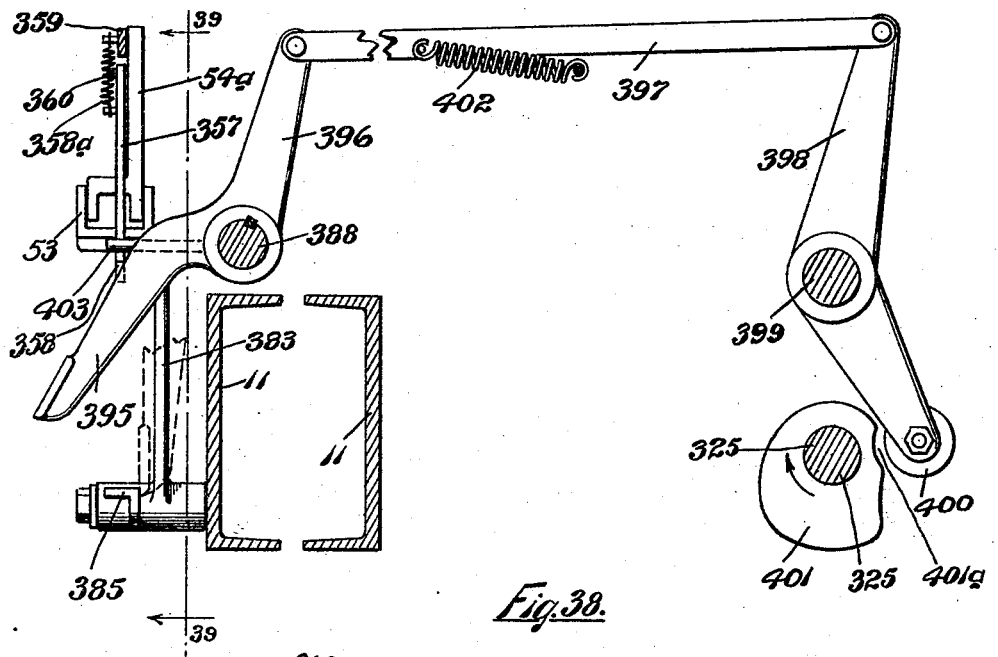
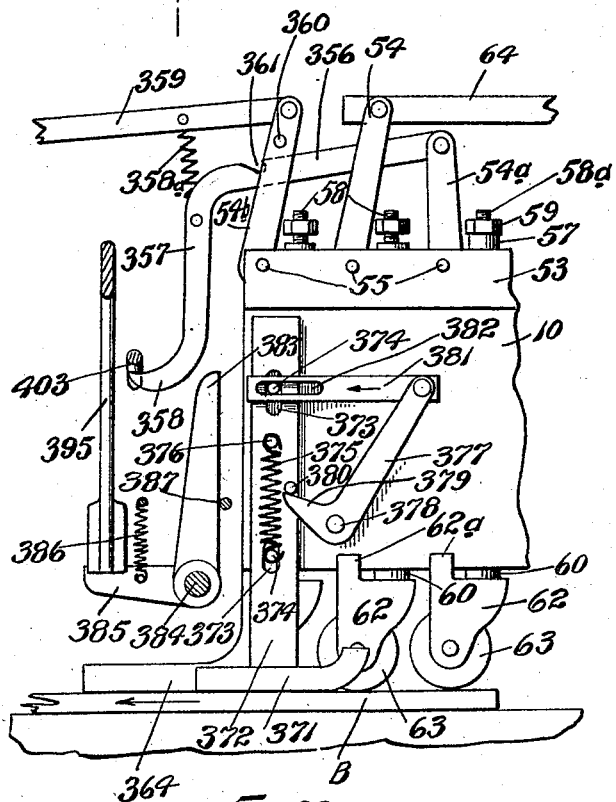

G. H. DICKERSON AND A. VANDERVELD.
LUMBER JOINING MACHINE.
APPLICATION FILED NOV. 2, 1920.
1,420,976.
Patented June 27, 1922.
26 SHEETS—SHEET 19.
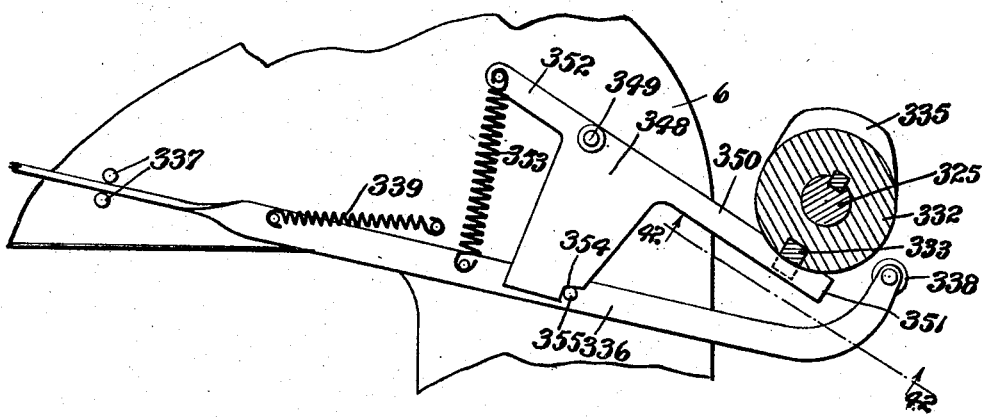
Fig. 40.
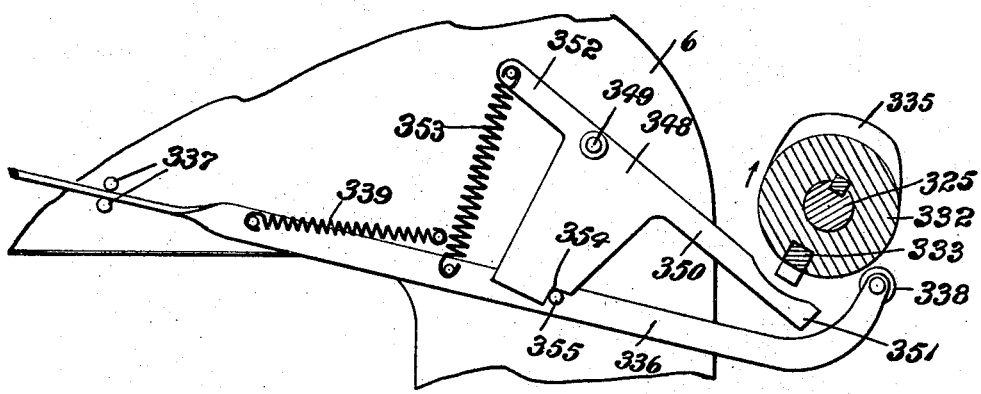
Fig. 41.
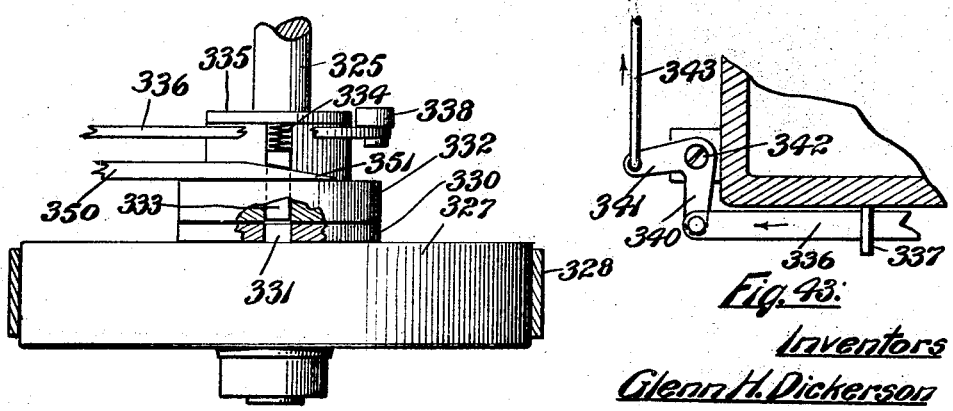
Fig. 42.
Fig. 43.
Inventors
Glenn H. Dickerson
Anthony Vanderveld
By Frank E. Liverance, Jr.
Attorney G. H. DICKERSON AND A. VANDERVELD.
LUMBER JOINING MACHINE.
APPLICATION FILED NOV. 2, 1920.

1,420,976.

Patented June 27, 1922.
26 SHEETS—SHEET 22.

Inventors
Glenn H. Dickerson
Anthony Vanderveld
By Frank E. Liverance Jr.
Attorney

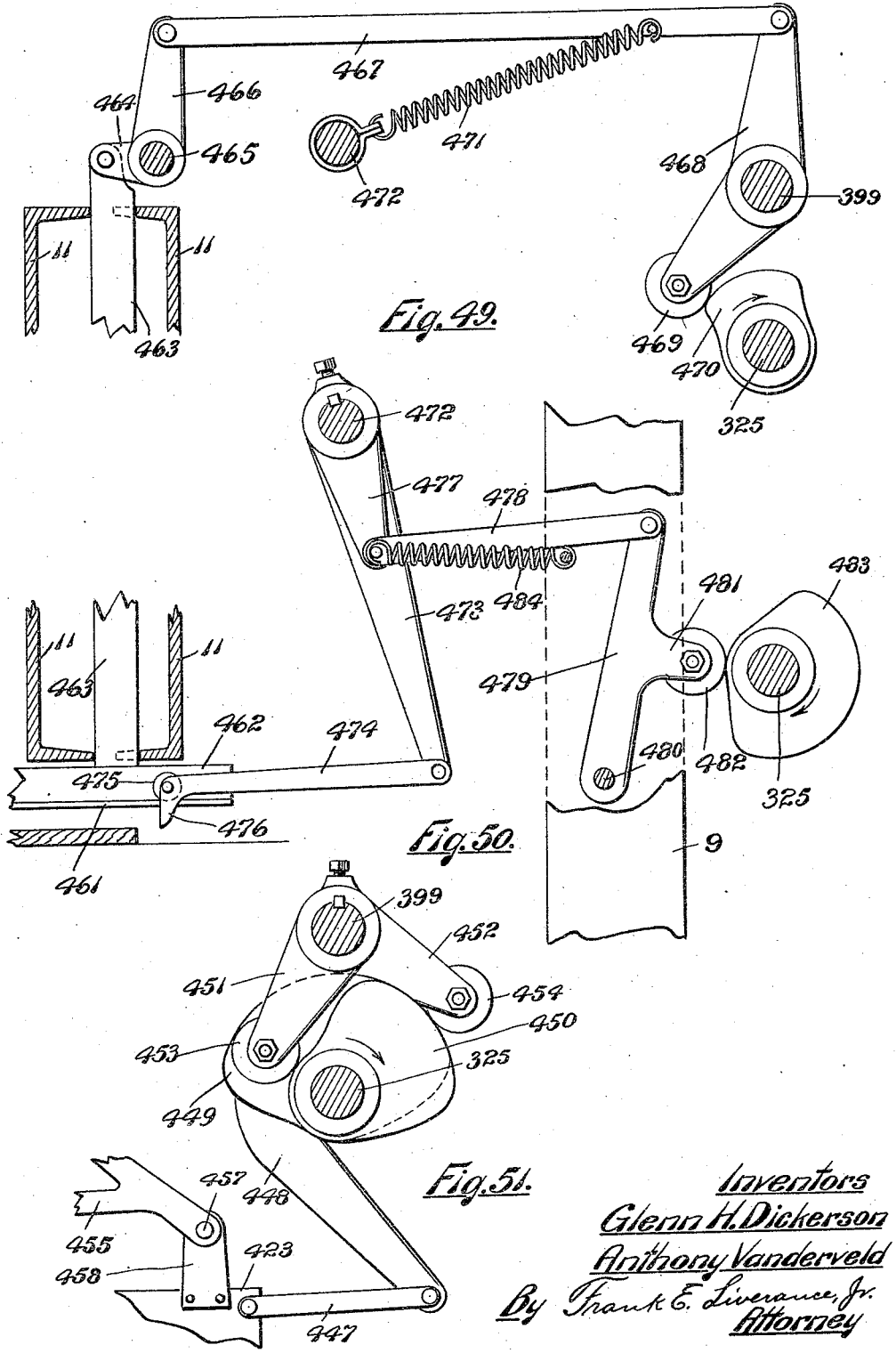

G. H. DICKERSON AND A. VANDERVELD.
LUMBER JOINING MACHINE.
APPLICATION FILED NOV. 2, 1920.
1,420,976.
Patented June 27, 1922.
26 SHEETS—SHEET 24.
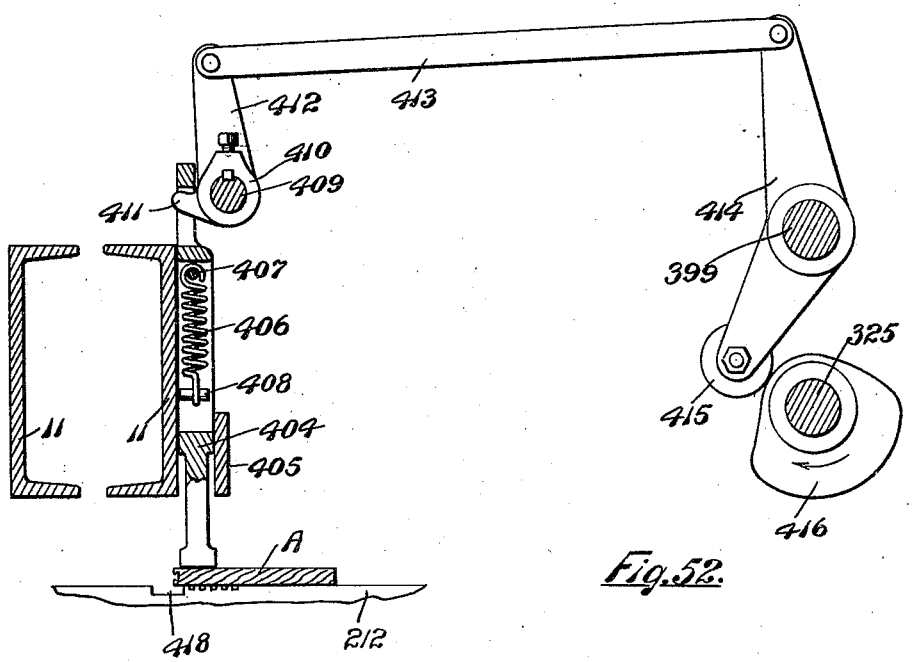
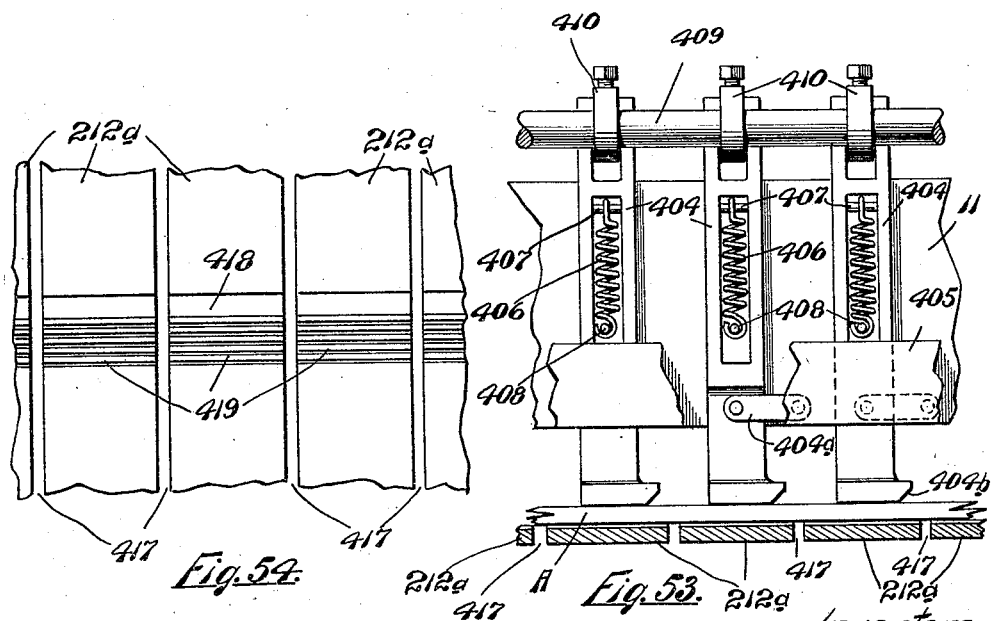
Inventors
Glenn H. Dickerson
Anthony Vanderveld
By Frank E. Liverance, Jr.
Attorney G. H. DICKERSON AND A. VANDERVELD.
LUMBER JOINING MACHINE.
APPLICATION FILED NOV. 2, 1920.
1,420,976.
Patented June 27, 1922.
26 SHEETS—SHEET 25.
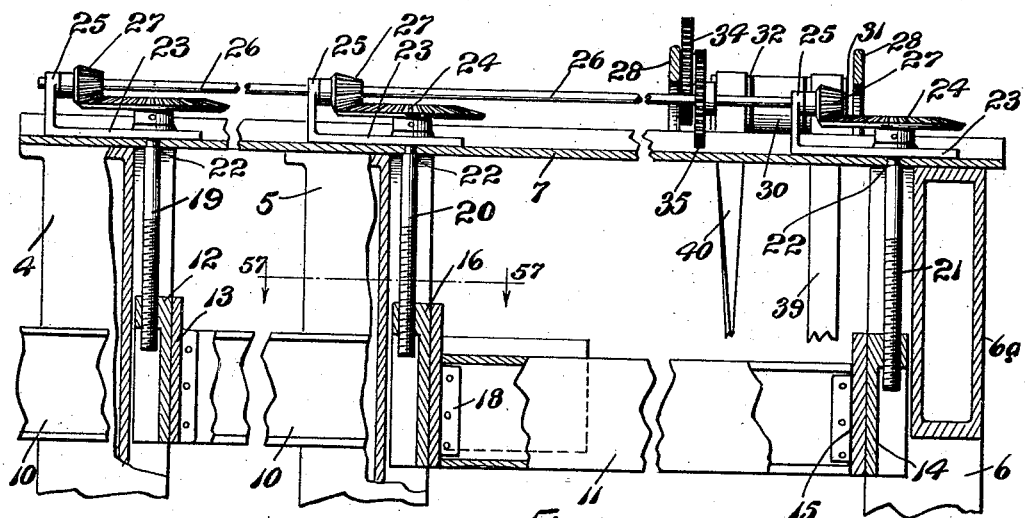
Fig. 55.
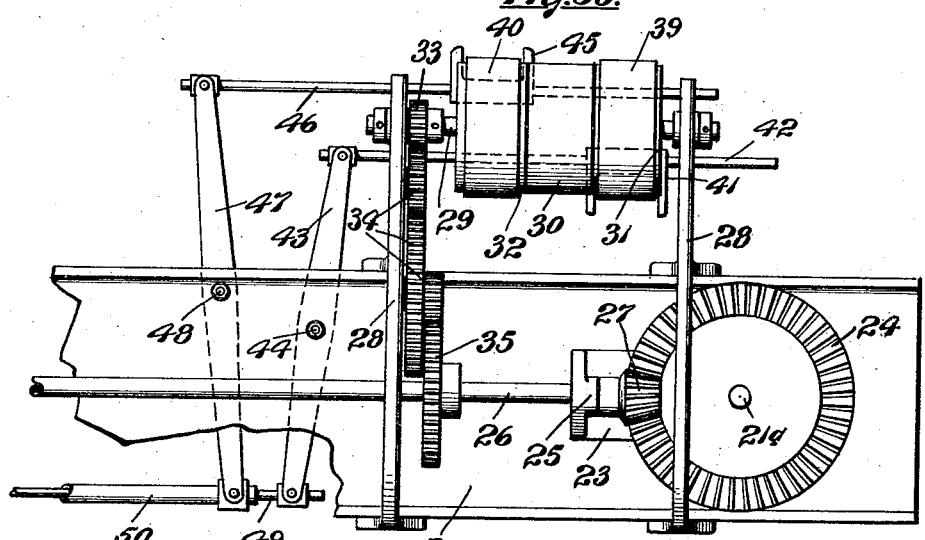
Fig. 56.
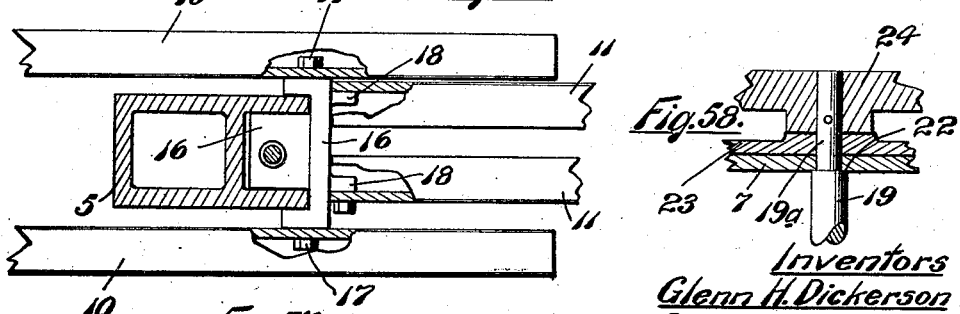
Fig. 57.
Fig. 58.
Inventors
Glenn H. Dickerson
Anthony Vanderveld
By Frank E. Liverance, Jr.
Attorney

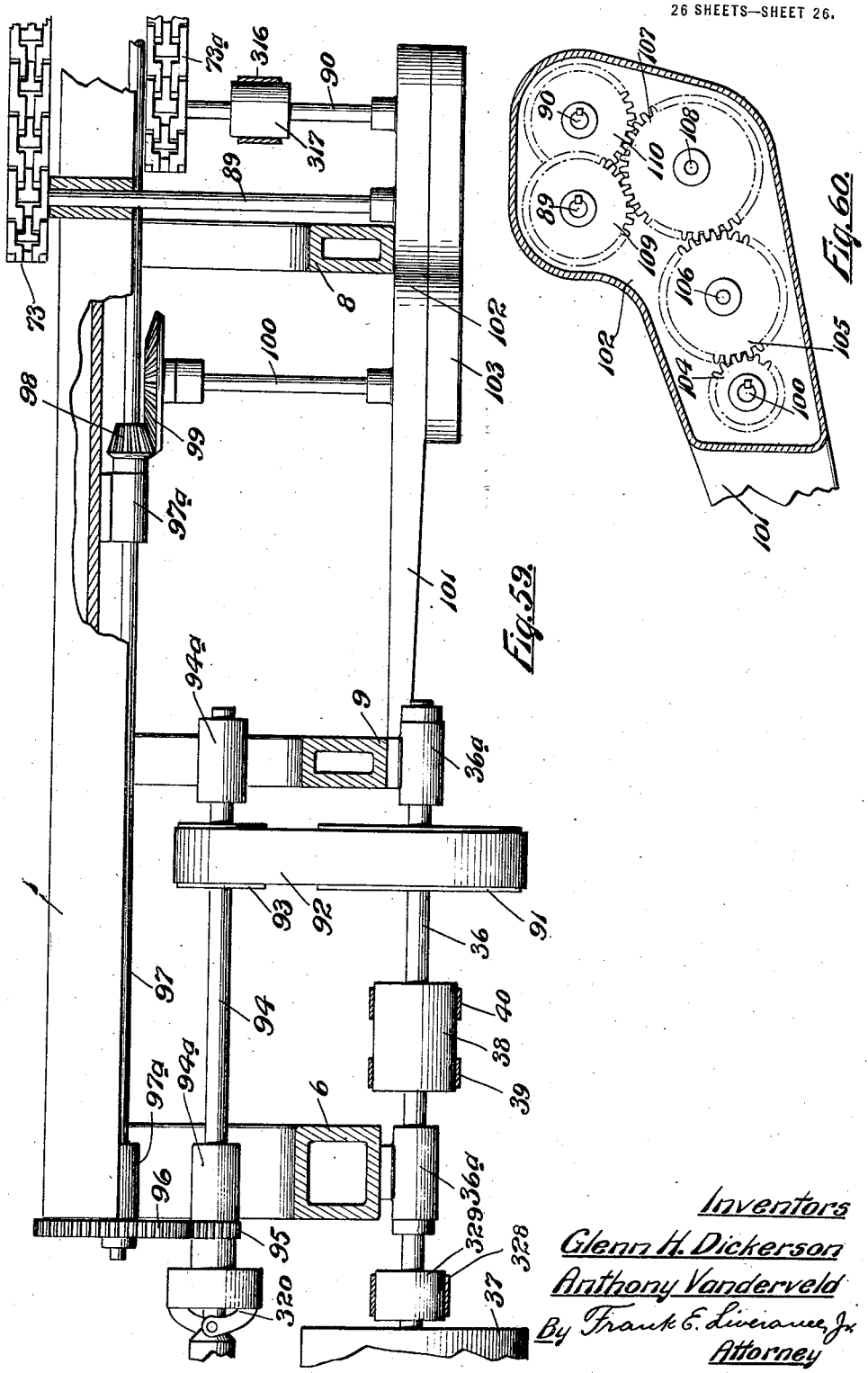

UNITED STATES PATENT OFFICE.

GLENN H. DICKERSON AND ANTHONY VANDERVELD, OF GRAND RAPIDS, MICHIGAN, ASSIGNORS TO DICKERSON GLUE JOINTER COMPANY, OF GRAND RAPIDS, MICHIGAN, A CORPORATION OF MICHIGAN.

LUMBER-JOINING MACHINE.

1,420,976.          Specification of Letters Patent.     Patented June 27, 1922.

Application filed November 2, 1920. Serial No. 421,239.

*To all whom it may concern:*

Be it known that we, GLENN H. DICKERSON and ANTHONY VANDERVELD, citizens of the United States of America, residing at Grand Rapids, in the county of Kent and State of Michigan, have invented certain new and useful Improvements in Lumber-Joining Machines; and we do hereby declare the following to be a full, clear, and exact description of the invention, such as will enable others skilled in the art to which it appertains to make and use the same.

This invention relates to lumber joining machines of the general type shown in United States Patents Nos. 1,264,026 and 1,318,851 issued, respectively April 23, 1918 and Oct. 14, 1919, and consists in further developments and improvements over the constructions disclosed in such patents to make a complete and particularly efficient practical machine for cooperatively forming and cutting connecting tongues and grooves on adjacent edges of boards to be joined together, applying glue thereto, automatically forcing the boards together in joined relation, and ejecting the joined boards from the machine at an end of the machine opposite to that at which the feeding of all of the boards takes place. The invention consists in many novel constructions and mechanisms for effectively attaining the above described ends together with means for automatically cutting tapering tongue and groove in the edges of boards to be joined together, and several automatically operating mechanisms for shifting the boards and holding the same against movement immediately prior to the beginning of the joining and during the process of joining, after which the boards joined are automatically ejected from the machine. All of these features with mechanism for accomplishing the same, together with many others not specifically enumerated at this point will appear fully and in detail as understanding of the invention is had from the following description, taken in connection with the accompanying drawings, in which, Fig. 1 is a front elevation of approximately the forward half of the machine.

Figs. 5 and 6 are diagrammatic plans of the essential major elements of the machine, the front and rear portions of the machine being shown in the two figures.

Fig. 7 is a fragmentary plan, with parts in section of the feeding table and front part of the carrying chains.

Fig. 8 is a transverse vertical section through the indicating gage governing the board gage on the feed table.

Figs. 9 and 10 are, respectively, fragmentary transverse vertical sections on lines 9—9 and 10 of Fig. 7 and looking in the directions indicated by the arrows.

Figure 11:
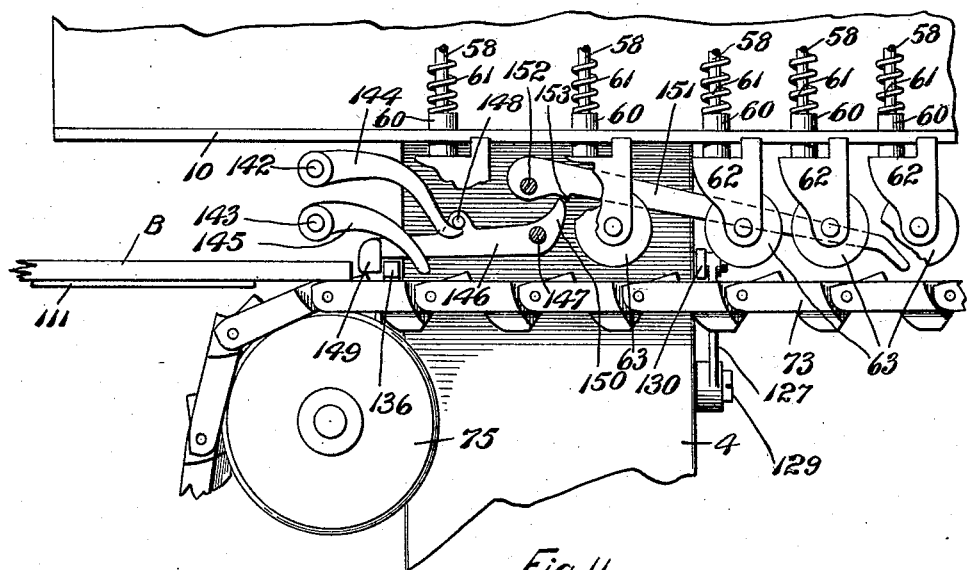

Fig. 11 is a fragmentary side elevation showing the safety stop mechanism at the front side of the machine.

Figure 12:
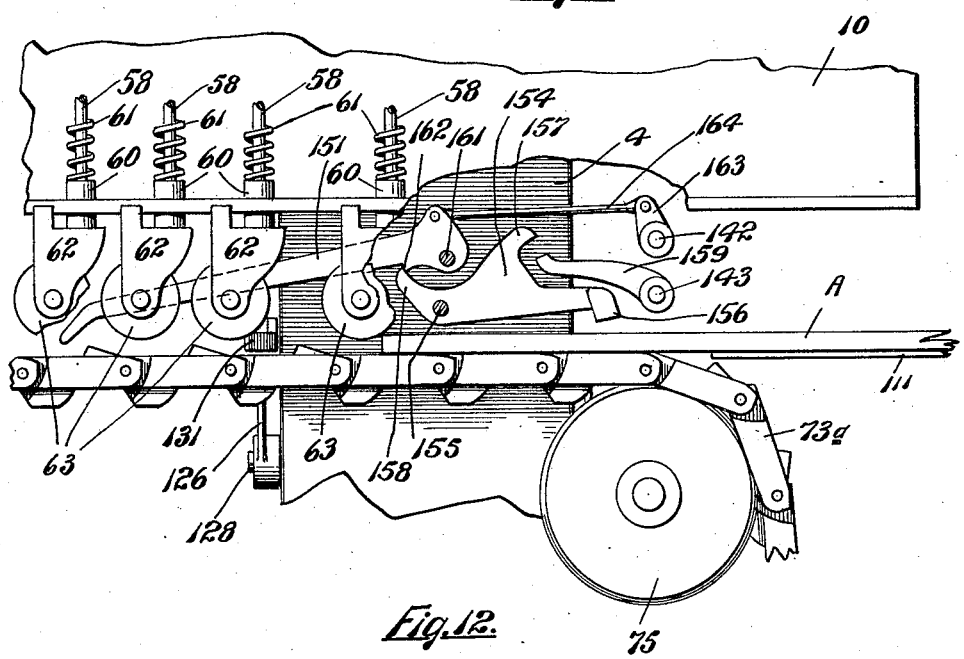

Fig. 12 is a similar elevation showing said mechanism at the rear side of the machine.

Fig. 13 is a perspective more or less diagrammatic view of the safety stop mechanism showing the parts thereof in one position.

Fig. 14 is a similar view showing the parts of the mechanism in a different position.

Fig. 15 is a fragmentary enlarged elevation of the front part of the board shifting mechanism for changing the board with relation to the cutters.

Fig. 15$^a$ is a transverse vertical section on the plane of line 15$^a$—15$^a$, of Fig. 15 looking in the direction of the arrows.

Fig. 16 is a framentary plan of the main clutch controlling lever of the machine.

Fig. 17 is a plan and section substantially on the plane of line 17—17, of Fig. 15.

Fig. 18 is a fragmentary end view and section showing the change speed gearing used for driving the shifting mechanism shown in Figs. 15 and 17.

Fig. 19 is an enlarged fragmentary elevation of the pivotally mounted table shifted for changing the board with respect to the cutters, with adjacent cooperating mechanism.

Fig. 20 is a transverse section through the machine and showing the set of cutters on one side of the machine in elevation, parts being in section.

Fig. 21 is a similar view showing the cutters on the opposite side of the machine.

Fig. 22 is a plan and section on the plane of line 22—22, of Fig. 20.

Fig. 23 is a longitudinal vertical section on the planes of the broken line 23—23 of Fig. 20, looking as indicated by the arrow.

Fig. 24 is a fragmentary plan and section illustrating the manual operating means for the cutter adjustment.

Fig. 25 is a fragmentary partial elevation and section showing the construction of the carrying chains.

Fig. 26 is a fragmentary plan, with a part in section, of said chain.

Figs. 27, 28, 29 and 30 are elevations illustrating the four forms of cutters used with the four cutting heads in the machine.

Fig. 31 is a plan of one of the cutter heads.

Fig. 32 is a transverse vertical section through the machine at the gluing mechanism thereof.

Fig. 33 is a fragmentary plan, partly in section of the immediate gluing mechanism.

Fig. 34 is a fragmentary elevation and section illustrating the means used for elevating all of the presser rollers on a side of the machine simultaneously.

Fig. 35 is a fragmentary rear elevation of the eccentric for operating said elevating devices for the presser rollers.

Fig. 36 is a similar view showing the parts in different position.

Fig. 37 is a fragmentary enlarged elevation, with parts broken away of the mechanism at the rear end of the machine and at the front side thereof.

Fig. 38 is a transverse section through the machine at the rear of the presser rollers and illustrating the automatic latch mechanism for holding the front board clamps in downward position and against the first board feed through the machine after it has been shifted forwardly.

Fig. 39 is a fragmentary section and elevation taken on line 39—39 of Fig. 38, looking as indicated by the arrow.

Fig. 40 is a fragmentary elevation showing the automatic clutch operating mechanism for the cam shaft of the machine.

Fig. 41 is a similar view showing the parts in a different position.

Fig. 42 is a fragmentary section and under plan looking upwardly on the plane of line 42—42, of Fig. 40.

Fig. 43 is a fragmentary detail of mechanism showing the connection between the clutch operating bar and the automatically operated draw rod therefor.

Figure 44:
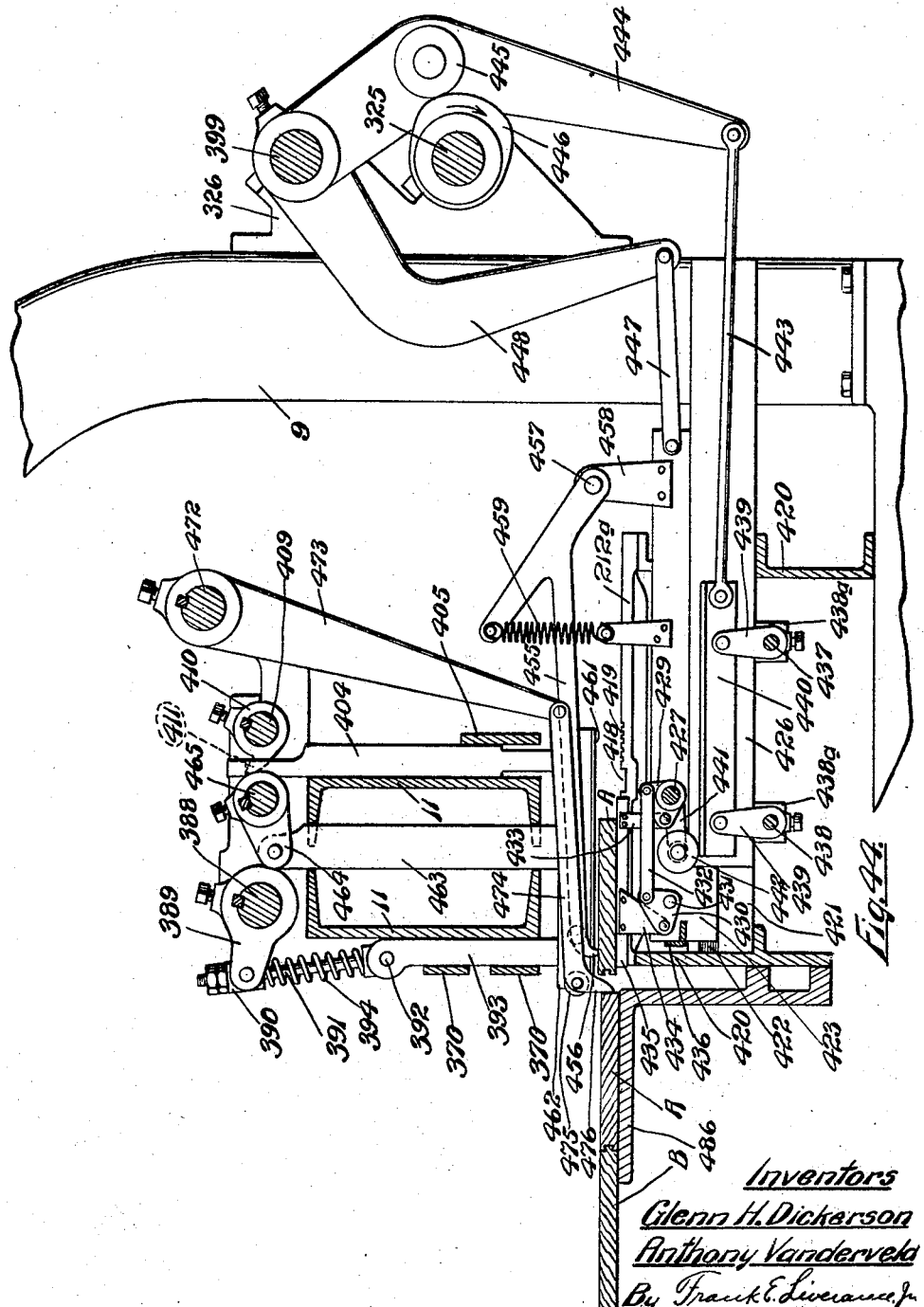

Fig. 44 is a transverse section through the rear end of the machine illustrating the ejecting mechanism as it is operating to eject two joined boards.

Figure 45:
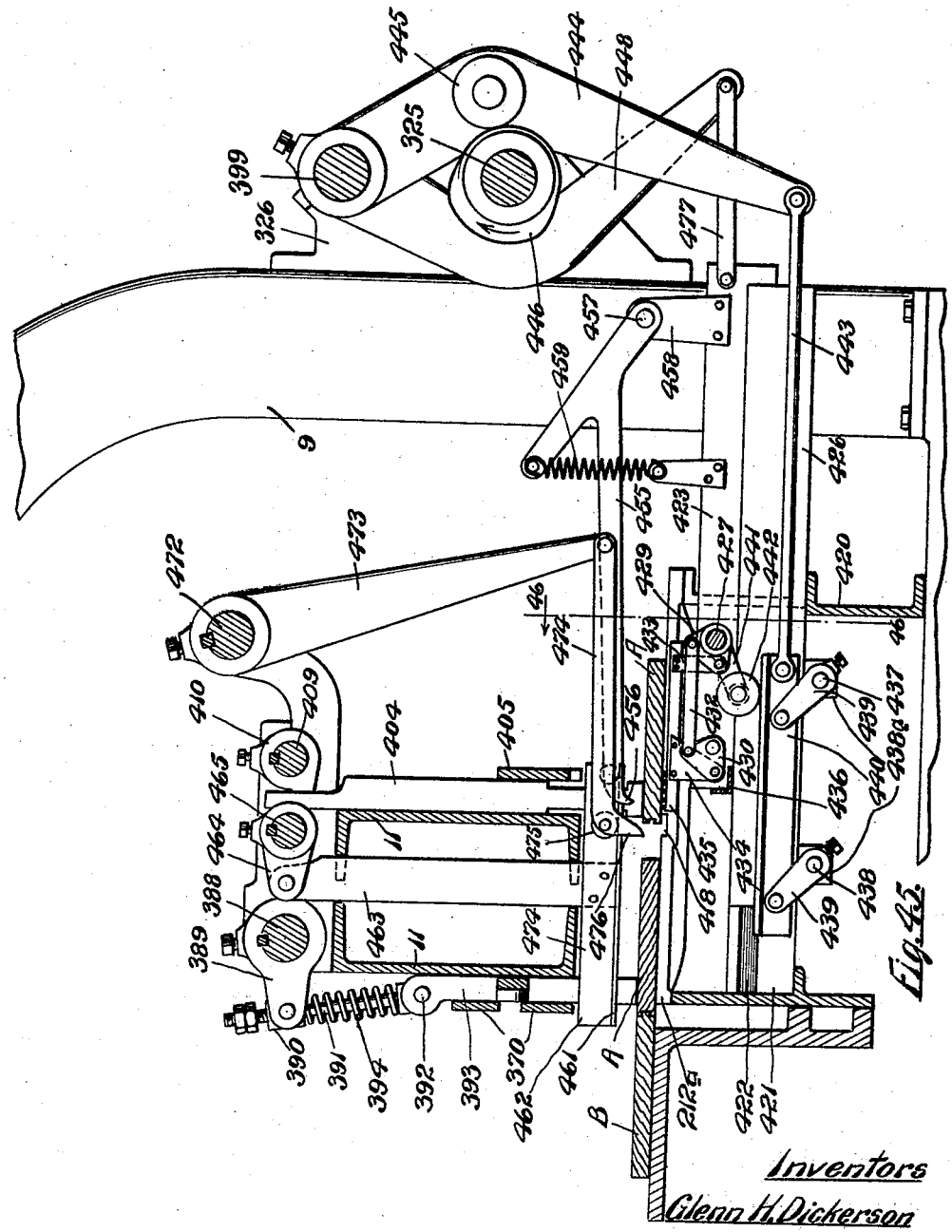

Fig. 45 is a similar view of the parts immediately prior to the initiation of the ejecting movement.

Figure 46:
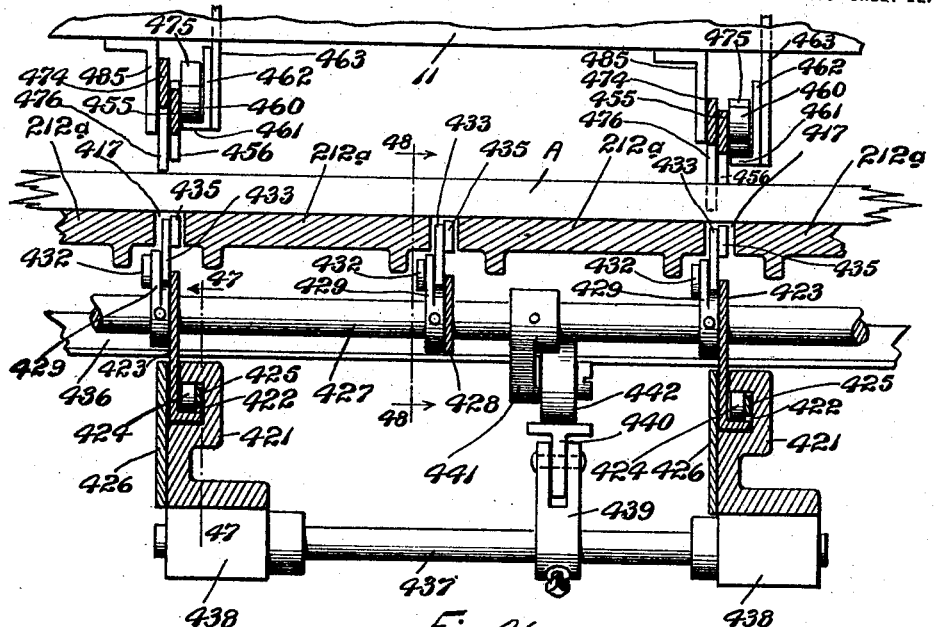

Fig. 46 is an enlarged vertical longitudinal section substantially on the plane of line 46—46, of Fig. 45 looking forwardly.

Figure 47:
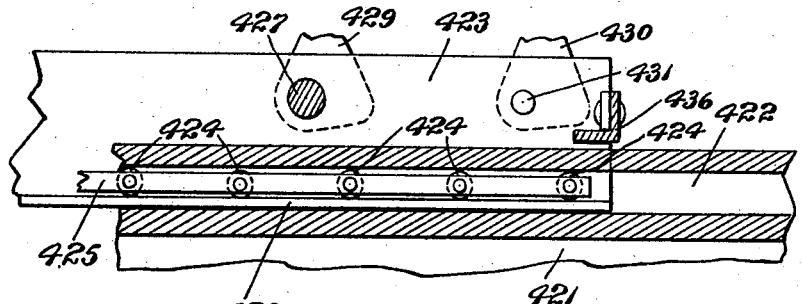
Figure 48:
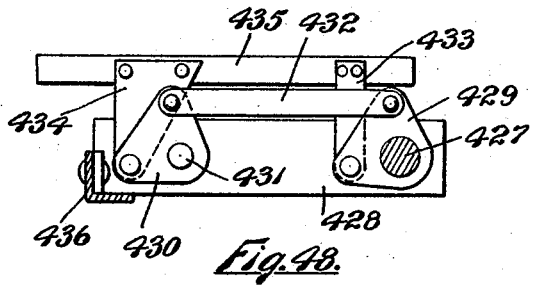

Figs. 47 and 48 are fragmentary transverse sections taken vertically on the planes of lines 47—47 and 48—48, respectively, of Fig. 46.

Fig. 49, Fig. 50, Fig. 51 and Fig. 52, are sections taken at different vertical planes through the rear upper part of the machine and illustrating the different cam operations which follow on rotation of the cam shaft.

Fig. 53 is a fragmentary rear elevation of the rear upper part of the machine showing the rear presser feet and their mounting.

Fig. 54 is a fragmentary plan of the transversely divided table at the rear end of the machine over which the boards are shifted and joined.

Fig. 55 is a fragmentary section, with parts broken away, illustrating the adjustable mounting of the presser roller carrying channels.

Fig. 56 is a fragmentary plan showing the mechanism for raising or lowering said channels and attached parts.

Fig. 57 is a fragmentary enlarged plan and section taken on the line 57—57, of Fig. 55.

Fig. 58 is a vertical section illustrating the mounting and construction of the adjusting screws for the channels.

Fig. 59 is a plan, partly in section at the rear end of the machine and below the board table showing the arrangement of the driving mechanism for the major portion of the machine.

Fig. 60 is a fragmentary section and front elevation of the gearing used to drive the chain drive shafts, and Fig. 61 is a partial plan and section illustrating the drive for the cutter spindles.

Like reference characters refer to like parts in the different figures of the drawings.

In the construction of the machine, a main supporting I-beam 1 is used and extends the full length of the machine, being carried by and supported by brackets 2 and 3 to lie a short distance above the floor. A heavy post 4 between the ends of the beam and a similar post 5 spaced from the post 4 extend vertically above the beam a distance from the front and rear ends thereof. At the rear end of the beam 1, a heavy supporting casting 6 is located having a horizontal upper arm 6ª, and a channel 7 extends between said arm and the front post 4 and over post 5, being permanently secured thereto in any suitable manner. Intermediate supporting members 8 and 9 between the end support 6 and the post 5 complete the rigid frame of the machine on which the various elements of the mechanism are mounted.

A pair of channels 10 located in spaced parallel relation extend from in front of the front post 4 to a short distance back of the rear post 5. A second pair of channels 11 extend between post 5 and the rear support 6, being closer together than channels 10 and at their front ends coming between the rear ends of said channels 10 (see Fig. 57). Post 4 on its rear side is formed with a vertical guide in which a guide block 12 is slidably mounted and to which both channels 10 are connected, use being made of a connecting member 13 for the purpose. A guide block 14 is likewise mounted for vertical sliding movements on the rear support 6 and the rear ends of channels 11 connected thereto by connecting member 15. A third guide block 16 is slidably mounted in a suitable vertical guide in the rear side of post 5 to which both channels 10 and 11 are connected, bolts 17 passing through channels 10 and the sides of block 16, while lugs 18 extend rearwardly from the block 16, into the front ends of channels 11, bolts being used to permanently connect the lugs and said channels 10. Screws 19, 20 and 21 thread, at their lower ends through blocks 12, 16 and 14 and at their upper portions pass through the web of the upper channel 7, being reduced in size to make a shoulder, such as 22, on each screw directly under the channel 7 as shown in Fig. 58.

A bracket 23 is secured to the channel 7 at each screw, the screws passing through the same and being equipped with a relatively large bevelled gear 24 at the upper end of each. Each bracket at one end is turned upwardly and formed with a bearing 25 and a shaft 26 is rotatably mounted in bearings 25, and extends the full length of channel 7. A plurality of bevelled pinions 27 are fixed on shaft 26, one being in mesh with each gear 24.

At the rear end of channel 7 two supporting bars 28 are secured in spaced parallel relation and extend back of the channel a distance, a shaft 29 being rotatably mounted on and between the bars. A pulley 30 is fixed on the shaft and two loose pulleys 31 and 32 mounted loosely on the shaft one at each side of the fixed pulley. A pinion 33 fixed on the shaft drives a train of gearing 34 interposed between it and a gear 35 on shaft 26 (see Fig. 56). The main drive shaft 36 of the machine is located at the rear end and rear side of the machine, being mounted in bearings 36ª on supporting members 6 and 9 having a pulley 37 which may be belt driven from any suitable power shaft or other power source. An elongated drive pulley 38 is fixed on shaft 36. Two belts 39 and 40 pass around pulley 38 and thence around loose pulleys 31 and 32, one of the belts, as 40, being crossed so that pulleys 31 and 32 are driven in opposite directions.

A fork 41 is associated with belt 39 being secured on a rod 42 slidably mounted on and passing through the bars 28. At its front end rod 42 has pivotal connection with one end of a lever 43 pivotally mounted between its ends on channel 7 as indicated at 44. A second fork 45 is associated with belt 40 and is connected with a slidably mounted rod 46 likewise pivotally connected at its front end to one end of a second lever 47 also pivotally connected between its ends at 48 to channel 7. The two levers 43 and 47 at their opposite front ends have pivotal connection to the rear ends of a rod 49 and sleeve 50, respectively, the rod passing loosely through the sleeve and both extending forward practically the full length of channel 7. The front end of rod 49 is pivotally connected to a lever 51 pivotally connected at its upper end to the channel 7 and the front end of sleeve 50 is similarly connected to a similarly mounted lever 52. It is evident that by swinging the proper lever 51 or 52 about its pivotal connection, either belt 39 or 40 may be shifted to the fixed pulley 30 to thereby drive shaft 26 and either raise or lower all of the channels 10 and 11 together with the mechanisms mounted thereon as will hereinafter appear; and that this adjustment of the channels is accomplished almost instantly and through the driving power of the machine, making it possible to change the mechanism for different thicknesses of stock in very short time.

A channel 53 lies above and extends the full length of each channel 10 being secured to the upper flange thereof. A plurality of bell-crank levers having substantially vertical arms 54 are pivotally mounted at 55 on and between the two upwardly extending flanges of channel 53 at both the front and rear sides of the machine, each lever having a forwardly extending horizontal arm 56 pivotally connected to a sleeve 57 which passes loosely through the web of channel 53 and upper flange of channel 10. It is to be understood that this structure is duplicated in both channels 10 and the description of one suffices for both. A rod 58 threaded at its upper end to receive a nut 59 passes loosely through each sleeve, extending downwardly alongside of the web of channel 10 and connecting at its lower end with an enlargement 60, substantially the same diameter as sleeve 57, whereby a coiled spring 61 under compression may be interposed between said part 60 and sleeve 57. The parts 60 on all of the rods 58 pass loosely through openings in the lower flange of channel 10 and connect to castor blocks 62 on each of which a roller 63 is mounted. Each block 62 is formed with upwardly extending guide lugs 62$^a$, one going to each side of the lower flange of channel 10 to hold the rollers in alinement. The rollers 63 are forced downwardly by spring pressure until stopped by nuts 59 and a board passing under the rollers, as later described, is pressed against by said rollers, any irregularities in the surface of the board or extra thickness of any board being taken care of through additional compression of the springs, the rods being free to move upwardly through sleeves 57.

The upper ends of all of the arms 54 are connected by a bar 64 to which all of said arms are pivotally connected. A link 65 connects the front end of each bar 64 with a pin 66 set off center on a disk 67 secured at one end of a short shaft 68 rotatably mounted in a bearing in bracket 69 secured to and extending upwardly from the front end of channel 53. The shaft carries an operating hand wheel 70, for manual operation. Link 65 is extended a distance in front of pin 66 and forward at its end with a hook 71. A second pin 72 projects from the face of disk 67, in one position, as shown in Fig. 35, coming under the link 65 and in the other, as shown in Fig. 36, coming under the hook 71. In the position shown in Fig. 35, which is the same as that shown in Fig. 34, the force of spring 61 acting through the bell-crank levers exerts a pull on the link 65, and this line of force in link 65 comes below the axis of shaft 68 tending to turn the disk in Fig. 35 in a counter clockwise direction and force pin 72 firmly against the link. Likewise in the other position the pin 72 is held by the same forces against hook 71. It is necessary only to turn hand wheel 70 so as to bring the line of force in link 65 to either side of the axis of shaft 68, after which the construction automatically holds itself in position either with the rollers in lower operative board securing position or in upper board releasing position. The object of the construction is to effect the release of a board fed into the machine at any time desired and at either the front or rear side of the machine by elevating the pressure rollers 63, should such release ever become necessary or desirable.

A pair of board carrying and driving chains 73 and 73$^a$ are mounted on the front and rear sides of the machine, running over idle pulleys 74, 75 and 76 and drive pulleys 77 in each of which a consecutive series of depressions 78 are made as shown in Fig. 25. The chains are identical in link construction but the rear chain is somewhat shorter than the front one, as indicated at Fig. 59, and a chain is located under each of the two series of pressure rollers 63.

The chain links in construction comprise a connecting cross portion 79, shaped to fit in recesses 78 of the drive pulleys from which two spaced apart sides 80 extend upwardly, the same being brought closer together beyond and above the cross member 79 as indicated at 81, sufficient that parts 81 may go between the parts 80 of the next adjacent link and pivotally connect therewith, a pivot pin 82 passing through the same. A block 83 is also pivotally mounted on the pin 82 between the parts 81 of each link and enlarged at its free end between the parts 80 of the link, being formed at its sides at such enlargement with slots or recesses 84 into which pins 85 project, the same being carried on the adjacent sides 80 of the link. A spring 86 is connected at one end to a lug 87 projecting from block 83 and at its opposite end to a cross pin 88 disposed between the narrowed side portions 81 of the link. The objects of this chain structure will appear with the description of the feeding of the boards through the machine.

Two drive shafts 89 and 90 are suitably mounted transversely of the machine on which the drive pulleys 77 for the chains are secured. A drive pulley 91 on the main drive shaft 36 has a belt 92 passing around it and a pulley 93 on a counter shaft 94 paralleling the shaft 36 and mounted on suitable bearings 94$^a$ on supports 6 and 9. A gear 95 adapted to be connected with shaft 94 is in mesh with a gear 96 secured to a long shaft 97 which extends the full length of beam 1 under the rear upper flange thereof, being carried by suitable bearings thereof, being carried by suitable bearings. A bevelled pinion 97$^a$ secured to the shaft 97 is in mesh with a similar 98 on the shaft 99 fixed on one end of a cross shaft 99, the rear end of which has a bearing in 100, the rear end of which has a bearing in a rigid support 101 disposed between the supports 8 and 9 at the rear side of the machine. At its forward upper portion, the support 101 is formed as a housing 102 for gearing, the same being covered by a cover 103. Shaft 100 has a gear 104 fixed at its end within the housing, which engages with a gear 105 mounted on a stud 106 and in turn meshing with a relatively wide faced gear 107 mounted on stud 108, two gears 109 and 110 fixed, respectively on the ends of shafts 89 and 90. Gears 109 and 110 are of the same size so that shafts 89 and 90 are driven at the same speed. The chains may be tightened to take up any slack by taking up the rods 74ᵃ which pass through bracket 2 and receive adjusting nuts and connect at their other ends with the shaft on which loose pulleys 74 are mounted, said shaft being mounted on links 74ᵇ so as to be swung back and forth for such adjustment.

A table 111 is located horizontally at the front end of the machine, being carried by supporting brackets and beams 112 disposed between supporting members 113 and 114 connected to and above the main beam 1. Front and rear guide angle bars 115 and 116 lie lengthwise of the table and above the same and are connected by toggle links 117. A number of rods 118 are connected to the table at their lower ends and extend vertically therefrom, being located between the bars 115 and 116 and each at its upper end carrying an indicating disk 119 provided with a number of graduations. A sleeve 120 is loosely mounted on each rod 118 and is formed with an eccentric 121 at its lower end. An arm 124 formed at one end with an eccentric housing 125 to connect with the eccentric 121, connects pivotally at its outer end with one of the bars 115 or 116. A handle 122 is attached to and extends from the upper end of each sleeve 120 and is provided with a pointer 123 for passing over the graduations on disk 119. It is evident that operation of the handles 122 serves to move bars 115 and 116 either toward or away from each other and the amount of such movement may be judged by the passage of the pointers 123 over the disks 119. The object of this construction is to vary the positions of boards for entrance to the carrying chains should the boards be bowed laterally so as to require a certain amount of trimming by the cutters of the machine to make their edges straight for joining with other boards.

On the rear face of post 4, two arms 126 and 127 are pivotally mounted at their lower ends, the former being connected to a shaft 128 which passes through the post, and the latter being mounted on pivot 129. A bar 130 is connected to and lies between the upper ends of said arms, its end extending beyond the rear arm 126 and being bent at an angle as shown at 131. This end 131 normally lies directly over the back chain 73ᵃ and interposes itself in the path of movement of the boards carried over such back chain. On the front face of the post two similar arms 132 and 133 are likewise pivotally mounted at their lower ends, the former being fixed to shaft 128 and the latter being mounted on a pivot 134. A sleeve 135 is carried at the upper end of arm 132 and a stop block 136 at the upper end of arm 133. A rod 137 connected to the block 136 passes through sleeve 135. A coiled spring 138 is placed around rod 137 between the block and sleeve and a nut 139 threads on to the end of rod 137 and against the opposite side of the sleeve. A coiled tension spring 140 disposed between the block 136 and the post 4 and connected at its ends thereto, has a tendency to draw block 136 back within the limits of the post 4, and move the end 131 of bar 130 over the back chain 73ᵃ, through the connection made by the fixing of both arms 127 and 132 to the same shaft 128. When block 136 is moved away from its normal position, it passes over the front chain 73 and interposes a stop to the entrance of any board to such front chain until moved out of the way.

Two plates 141 are connected to and depend from the channels 10 adjacent the front face of the post 4 and two shafts 142 and 143 are mounted on and between the plates one over the other. Fingers 144 and 145 are fixed on the front ends of said shafts and extend toward the rear end of the machine. A stop lever 146 is pivotally mounted at 147 on the front side of post 4 and carries a pin 148 adapted to lie over the end of the finger 144. At its front end the lever is formed with an enlarged head 149, and its rear end is turned upwardly and formed as a dog 150 back of the pivot 147. A trip bar 151 is pivotally mounted at its front end at 152 on the front side of post 4 and extends back over the end 150 of lever 146 being formed on its under side with a shoulder catch for the dog 150 of lever 146, as shown at 153.

An irregularly shaped lever 154 is pivotally mounted at 155 on the rear side of post 4, at its front end being formed with a stop head 156. This lever at its upper side and in front of the pivot is formed with a projection 157 and at its rear end with an upturned dog 158 similar to the part 150 on lever 146. The lower shaft 143 at its rear end carries a finger or arm 159 which extends toward the rear end of the machine, over the front end of lever 154 and in position to engage at its end with the projection 157. A trip bar 160 is pivotally mounted at its front end to the rear side of the post 4 at 161 and is likewise formed on its under side with a shoulder catch 162 for the dog 158 of lever 154. A short arm 163 is connected to and extends upwardly from the rear end of the upper shaft 142 and a link rod 164 connects the arm with the trip 162 at a point a distance above the pivot 161.

The first board, indicated at A is fed into the machine on the rear side thereof and is carried by chain 73ᵃ and under the rear pressure rollers 63. As it comes to the projecting end 131 of bar 130, it moves the bar forward to the dotted line position shown in Fig. 7, this causing all of the arms 126, 127, 132 and 133 to be turned toward the front side of the machine and move stop block 136 to the dotted line positon of Fig. 7, thereby interposing a stop against the entrance of a board at the front side of the machine until after the first board A has passed by the end 131 of bar 130 whereupon stop block 136 will be retracted to inoperative position. The front board B may then be entered into the machine. In the meantime the first board A has passed under the end of the trip 160 elevating the same and disconnecting the shoulder at 162 from the dog 158, thereby permitting the front stop end 156 of lever 154 to drop so that a second board A cannot be fed into the rear side of the machine. The lifting of the rear end of trip 160 also turns shaft 142 with attached finger 144, elevating the front end of lever 146 and bringing its dog 150 into engagement back of the shoulder 153. With the retraction of stop block 136, the front board B may be fed into the machine and as soon as its end comes to the trip bar 151 a disconnection of the trip from lever 146 occurs, dropping stop head 149 down to interpose against the entrance of a second board B which cannot be entered until a second board A has been entered. In fact the boards must be fed alternately into the machine. The second board A may be fed into the machine, however almost immediately after the first board B is entered, said board B passing under the finger 145 and turning shaft 143 to elevate finger 159 and, as a consequence, the front end of lever 154. The fact that a board B may be passing in front of the block 136 will not matter as the sleeve 135 may move on rod 137 and compress spring 138 even though the block is stopped from movement by striking against the edge of the board. The mechanism described insures the alternate feeding of the boards into the machine and the feeding of the boards A at the rear of the machine ahead of the succeeding boards B a distance equal to at least the width of the post 4 in the direction of the length of the machine.

As the boards pass lengthwise of the machine they come to cutters for cutting cooperating tongues and grooves on the edges of the boards where they are to be joined together. There are four sets of cutters, two being located at one side of the machine a short distance beyond the post 4, and two being located at one side of the machine a short distance ahead of the post 5. The mountings for the cutters is substantially the same in each.

A frame in which the cutter spindle for each cutter is carried comprises a cross bar or rod 165 at each end of which bars 166 are integrally formed, as shown in Fig. 22. Cross bars 167 connect the ends of bars 166, the bars 167 in each pair of cutter supports being located relatively close together. A rod 168 threaded at both ends to receive nuts 169 passes loosely through the opposite ends of bars 166, each of said rods 168 being permanently connected by a fixture 170ª to the main beam 1. By changing the positions of the nuts 169, the entire frame may be adjusted laterally with respect to the beam, as is evident.

The immediate holder for the cutter spindle, shown at 170, is mounted between the bars 166, having projecting bosses 171 and 172 extending from the holder 170 into which pins 173 passed through the bars 166 may enter. The holder 170 is also formed with alined bearings 174 and 175 in which the spindles 176 are rotatably mounted. Each spindle at its upper end is equipped with a plate 177 on which a number of cutters are fixed. In Figs. 27 to 30 inclusive, the four types of cutters used are shown. The first cutters to which the front boards B come, shown at 178 are of inverted frusto-conical shape with a groove 179 between the upper and lower sides. The first cutters 180 to which the rear boards A come are frusto-conical in form and are provided with an outstanding rib 181. The second cutters acting on boards B, shown at 182 are similarly shaped and with a groove 183 therein, and the second cutters 184 for the boards A are inverted frusto-conical in form with an outstanding rib 185. Cutters 178 and 182 together cut a dove-tail tongue on the edge of boards B, and cutters 180 and 184 cut a corresponding groove in the edge of boards A. The cutters are set at an angle to the vertical and are of conventional construction with recesses 186 in the sides, the cutting edges being at such recesses as shown in Fig. 31.

The spindles are provided with pulleys 187 and the pair of spindles on the front side of the beam 1 are driven through an endless belt 188 which passes around the drive pulley 189 of an electric motor 190 and an idle pulley 191 mounted on the side of beam 1. The pair of spindles at the rear of beam 1 are driven in an identical manner. Fig. 61 shows the way the belt is applied to the pulley spindles 187.

A vertical bar 192, at its upper end passes between guide blocks 193 on the beam 1, being formed with an outwardly projecting flange 194 through which two adjusting screws 195 pass, the bars 167 of a pair of cutter spindle frames resting on the upper ends of the screws. There are two of the bars 192, one for each pair of frames as shown in Fig. 23. The lower end of each bar 192 has pivotal connection with a horizontal arm 196 of a bell-crank lever which is pivotally mounted at 197 on the beam 1, the other arm of each lever extending vertically above the pivot. A rod 199 connects the upper ends of arms 198 and extends forward from the front arm through a bracket 200 fixed on beam 1. The front end of the rod is threaded and a bevelled pinion 204 threaded thereon which is in mesh with a bevelled gear 203 fixed on the rear end of a small shaft mounted in a bearing 201 made in bracket 200. A hand wheel 202 is secured to the front end of the shaft for manual operation thereof, it being evident that on operation of the hand wheel, pinion nut 204 is turned and the rod 199 moved lengthwise with a consequent simultaneous lifting or lowering of bars 192 and a raising or lowering of the cutters. This is for adjustment of the cutters with respect to the boards acted upon by them, and particularly when the thickness of boards run through the machine is changed, the adjustment for any given thickness of boards when once set remaining unchanged.

Each spindle carrier 170 is formed with a boss 205 at its lower end extending toward the beam 1 in which a horizontal hole 206 is bored. An arm 207 is pivotally mounted at 208 on the beam 1 for each carrier 170 and at its free end carries a pin 209 passing into the opening 206, thereby holding the lower ends of the spindle carriers at their lower ends from movement but allowing all of the various adjustments described.

Back of the feed table 111 are two tables 210, one at the front side and one at the back side of the machine over which chains 73 and 73ª run, the tables at their adjacent parts being formed with longitudinal ways or grooves for the reception of the chains. Tables 211 extend from post 4 substantially half way to post 5. Additional tables 211 and 212 for carrying the boards extend the remainder of the length of the machine, the former extending a short distance beyond the post 5 and the latter continuing to the rear end of the machine. Tables 211 and 212 are secured in horizontal position. The two tables 210 are pivotally mounted at their rear ends at 213 and at their front ends are supported on lugs 214 projecting from levers 215, one being at each side of the machine and mounted on pivot studs 216 on the post 4. The lugs 214 enter under the lower sides of the chain ways 210ª, and it is evident that on turning levers 215 the front end of tables 210 may be raised or lowered about pivots 213 and the position of the tables changed with respect to the horizontal. Each table at its front end is formed with a downwardly projecting ear 217 having a vertical slot 218 therein which receives a lug 219 projecting from the stationary post 4. The end of the lug and the slot is covered by a cover plate 220, this construction serving as a guide for the front end of each table in its movements.

The shaft 97, heretofore described, at its front end has a bearing in the bracket support 114 at the front end of the machine and a pinion 221 is fixed to said shaft. A series of gears 222, 223 and 224, the latter being fixed on the end of a shaft 225 is used for driving said shaft 225 from shaft 97 as shown in Fig. 17. Shaft 225 is mounted at one end in a bearing in bracket 114 and at its other end in a bracket 226 connected to the main beam 1. A second shaft 227 is mounted on and between brackets 114 and 226, paralleling shaft 225. A series of gears of different sizes are fixed on shaft 227, as shown at 228, with any one of which a gear 229 is adapted to engage. Gear 229 is carried between two upwardly extending arms 230ª of a handle 230 slidably mounted on shaft 225, a gear 231 being splined on the shaft and located between the arms 230ª so as to be in mesh with gear 229. Handle 230 extends forward and at its front end has a pivotally mounted latch 232 equipped with a pin 233 which is adapted to enter any one of a number of holes 234 in a front cover plate 235 covering the change speed gearing. This construction permits the shaft 227 to be driven at a number of different speeds with reference to shaft 225 and is a conventional change speed gearing common in lathes and similar machines.

A bevelled gear 236 is fixed at the rear end of shaft 227 and is in engagement with a similar gear 237 fixed on a cross shaft 238 mounted on and extending between the sides 239 of a channel shaped support, the base or web 240 of which rests on the upper side of beam 1, being permanently secured thereto. The shaft, at each end extends beyond the sides 239. On each end of the shaft a compound gear 241, collar 242 and clutch member 243 is loosely mounted, the gear of each member lying adjacent the outer side of sides 239. Gears 241 are in mesh with idle gears 244 mounted on the sides 239, the same in turn engaging with other gears 245 similarly mounted. A cam 246 is secured to and turns with each gear 245.

A lever 247 is pivotally mounted at its rear end at 248 on each side 239, being equipped with a roller 249 at its front end which rides against the cam 246. A spring 250 holds the roller against its associated cam. Levers 247 each is formed with an upwardly extending arm 251 and a link 252 is pivotally connected at its front end to each arm 251 and at its rear end with the lower end of lever 215 on the same side of the machine. A chain 253 is connected at its upper end to each collar 242, and at its lower end to the front end of an arm 254 of a bell-crank lever, pivotally mounted at 255 on beam 1, each lever including a vertical arm 256 with which a tension spring 257 is connected at one end, the other end being connected to the beam as shown in Fig. 15. Springs 257 have the normal tendency to turn the parts so that the rollers 249 lie against the shoulders of cams 246, as shown.

A clutch member 258 is splined on each end of shaft 238 for engagement with the adjacent clutch member 243. A plate 259 lies over the front part of the channel-like support bearing against the upper edges of the sides 239 and extends beyond the same at both front and rear sides. A post 260 is attached to and depends from each extension of the plate on which a sleeve 261 is loosely mounted and having yoke arms 262 engaged with a collar 263 formed integral with each clutch member 258. An arm 264 and a pin 265 extends from each sleeve toward the center of the machine, each pin 265 being located in the path of movement of a pin 266 projecting from each gear 244.

A supporting member 267 of the shape shown in Fig. 15 is connected to and extends above plate 259. Two rods 268, each having laterally extending upper and lower ears 269 and 270 and inwardly extending upper and lower pivot lugs 271 are located in parallel vertical relation between the upper side of member 267 and a lower cooperating support 267ª, pivot pins 272 passing through the lugs 271 which overlap as shown in Fig. 15ª. The lower ears 270 at their outer ends lie directly back of the ends of arms 264. A rod 273 passes through each pair of ears and arms 270 and 264, coiled springs 274 on the rods 273 serving to hold the arms and ears yieldingly in contact.

A rod 275 is attached at its forward end to each of the upper ears 269. Each rod extends to the rear and is attached at its rear end to the upper end of a lever 276 pivotally mounted at its lower end on a channel 10. Each lever 276 is formed with projecting lugs 278 which bear against a disk 279 located above and resting on one of the enlargements 60 of one of the presser roller assemblies. It will be noted that the roller 63 with which the lever 276 is associated is directly in vertical alinement with the cutter construction which will first act on the board coming to it so that when the board first passes under said roller, elevating it and its attached parts, the lever 276 will be simultaneously turned on its pivot and rod 275 given a longitudinal movement to the rear. There are two of the levers 276, one on the front and one on the back of the machine, and to operate the same, the front and rear boards B and A fed into the machine elevate the proper pressure roller assemblies when they reach the same.

The pull given to either rod 275 turns the attached vertical rod 268 and thereby throws a clutch member 258 into engagement with its cooperating clutch member 243. The gears 241, 244 and 245 on the side of the machine in which the board is fed are thereupon turned with a consequent rotation of the cam 246 in the direction indicated by the arrow in Fig. 15, elevating the front end of lever 247 uniformly with a consequent uniform elevation of the front end of the connected and associated table 210 about its pivot 213. The cutters remaining stationary so far as vertical movement is concerned, it is evident that the tongue and groove cut in the inner edges of the boards B and A are uniformly tapered from one end to the other and that the front end of the groove in board A is wider than its rear end, while the front end of the tongue on board B is narrower at its front end than at its rear end. The amount of taper is governed by the speed of rotation of shaft 227 which speed is controlled by the change speed gearing mechanism. The amount of the taper for longer boards is less in degree than for shorter boards and the shaft 227 is driven at correspondingly less speed. In every case it is designed that the boards shall be past the first cutters before the tilting of the table 210 is stopped. This tilting of the table stops automatically when pin 266 on gear 244 comes against pin 273 on sleeve 261, with a resultant throwing of clutch 258 out of engagement with clutch 243, whereupon the spring 257, which has been extended with the rotation of clutch 243 and collar 242 and the winding of chain 253 on the collar, acts to unwind the chain and return the parts to original position, the table 210 being returned to horizontal for the next board.

The boards, after action by the cutters pass to the gluing mechanism. This mechanism is located immediately beyond the post 5. A glue receptacle 280 located below and between the tables 211 has an extension 281 to the front for the convenient entrance of glue therein, the whole being jacketed by a jacket 282 with a space between the jacket and receptacle for the circulation of steam to heat the glue. This construction on its under side is equipped with guides 283 slidably engaging with the upper end of a bracket 284 which in turn is slidably mounted on a vertical guide 285 supported a distance in front of the beam 1 by arms 286. The guide 285 has a rack 287 provided at one edge thereof back of the corresponding guide 288 on bracket 284 with which a pinion 289 engages, the same being fixed at the rear end of a short shaft mounted in a bearing 290 on bracket 284. A hand wheel 291 is secured to the front end of the shaft, it being obvious that the glue receptacle may be vertically adjusted by this means or that the entire receptacle and jacket may be removed for cleaning or other purposes whenever desired.

A bar 292 is located over the glue receptacle 280 lengthwise of the machine in which two bearings 293 and 294 oppositely inclined at angles to the horizontal are made in which shafts 295 and 295ᵃ are rotatably mounted. A head 296 is fixed at the lower end of shaft 295 on which a brush 297 is secured. Similarly, a head 298 equipped with a brush 299 is fixed on the lower end of shaft 295ᵃ. Gears 300 and 301 are fixed at the upper ends of shafts 295 and 295ᵃ. The brushes when rotated, carry glue from the receptacle to the tongued and grooved edges of the boards as fully shown in Fig. 32.

On two studs 302 and 303 secured to and extending upwardly from bar 292, gears 304 and 305 are mounted. A pinion 306 also mounted on and above the bar is in mesh with gear 305 and a second pinion 307 fixed at the lower end of a vertical shaft 308 is in mesh with the first pinion 306 and the other gear 304. The gears 304 and 305 are connected with gears 309 directly below, the same having engagement with the gears 300 and 301 on shafts 295 and 295ᵃ, whereby on rotation of the shaft 308 the two brushes are continuously rotated.

Shaft 308 extends upwardly and at its upper end has a bearing in a supporting casting 310 carried on the upper channel 7. A bevelled pinion 311 is splined on shaft 308 above the casting. A shaft 312, mounted in bearings 313 on the casting, has a bevelled gear 314 at one end in mesh with pinion 311. On its outer end shaft 312 carries a pulley 315 around which an endless belt 316 passes, the same also passing around a drive pulley 317 on the shaft 90 heretofore described. When the chains are running, the glue brushes are continuously turning. At the rear end of the bar 292, two oppositely extending arms 318 are suitably secured, each carrying brushes 319 at its outer end which serve as wipers to remove any excess of glue from the edges of the boards as the same pass.

A clutch 320 is used to connect the sleeve 94ᵃ which carries pinion 95 with shaft 94. One part of the clutch carried on the end of shaft 94 is moved into engagement with the other part carried by sleeve 94ᵃ through movement of the pivotally mounted lever 321 connected with the first clutch part, the lever at its upper end having a forwardly extending rod 322 connected therewith which runs forward nearly to the front end of the machine, having attachment at its front end to the rear end of a pivotally mounted lever 323, formed with a handle 324 at its front end for manual operation. After the main drive shaft is running, the remainder of the machine may be set in motion by throwing the lever 323 to connect clutch 320; and the machine may be stopped from the front end by operation of the lever in the opposite direction.

A cam shaft 325 is rotatably mounted in bearings 326 on the supports 6, 8 and 9. At its rear end a wheel 327 is loosely mounted which is continuously driven from the drive shaft 36 by a belt 328 going around the same and a drive pulley on shaft 36 shown at 329. The wheel 327 on its front has a hub 330 in which a consecutive series of openings 331 are made, the same making one member of a clutch, while a companion clutch member 332 is fixed on the cam shaft closely adjacent in which a bar 333 is slidably mounted and adapted to enter any one of said openings 331 to connect the wheel 327 and the cam shaft together. The bar 333 is normally impelled toward the member 330 by a spring 334 located between the bar and a cam 335 located at the inner end of the second clutch member 332.

A bar 336 is slidably mounted on the support 6 between pins 337, being turned upwardly at its free end and equipped with a roller 338 adapted to ride on cam 335. A spring 339 normally tends to draw the roller against the cam. A bell-crank lever having arms 341 and 340 is pivotally mounted at 342 at the front of support 6, the opposite end of bar 336 having connection to arm 340, and a rod 343 having connection at its rear end to arm 341 as shown in Fig. 43. Rod 343 extends forward to a lever 344 pivotally mounted at 345 near the rear end and on the front side of the front channel 10, said lever being equipped with off-set lugs 346 adjacent its lower end which bear against a disk 347 lying on the upper end of one of the parts 60 of one of the pressure roller assemblies near the rear of the run of chain 73. Accordingly as soon as a board B reaches said assembly at its entering end, elevating the same, a pull is exerted on the rod 343 with a consequent longitudinal movement of rod or bar 336.

An irregularly shaped member 348 is pivotally mounted at 349 on the support 6 above bar 336, an extension arm 350 projects from said member under the clutch member 332, said arm at its end being shaped as a wedge 351 which normally enters a cam slot in bar 333 and holds the bar from entrance into any of the openings 331. A second extension 352 in the opposite direction from the member is connected at its end with bar 336 by a tension spring 353. A notch 354 in the lower corner of member 348 normally receives a pin 355 projecting from the bar 336.

When a longitudinal movement is given to bar 336 as previously described, the pin 355 engaging against the member 348, turns it about its pivot 349 and moves the arm 350 downwardly into the position shown in Fig. 41. Wheel 327 is thereupon allowed to connect with cam shaft 325 by reason of the entrance of bar 333 into an opening 331 and the cam shaft is rotated. In the course of its rotation, cam 335 comes against roller 338 and the end of bar 336 is depressed sufficient to carry pin 355 out of notch 354, the arm 350 thereupon elevating to normal position with the pin 355 located under the lower edge of member 348 during the time that the board B is moving under the pressure roller assembly which actuates lever 344. As soon as the cam shaft 325 approaches the completion of one revolution, the wedge at 351 engages with the bar 333 and automatically withdraws it from the opening 331 in which it is seated, one complete revolution of the cam shaft only taking place. When board B has passed by such roller assembly, spring 339 draws bar 336 back to normal position and pin 355 again seats in notch 354. The tripping of the clutch and automatic rotation of cam shaft 325 through one rotation, in all instances occurs when the front boards come to and trip the lever 344.

The rod $58^a$ of the pressure roller assembly actuating lever 344 is slightly modified in construction, having a nut both above and below the sleeve 57 so that it is rigidly fastened to the rod. Spring 61 is also eliminated. The bell-crank lever attached to the sleeve has a shorter vertical arm $54^a$ which is not attached to the bar 64 but has pivotal connection with one end of a bar 356 extending rearwardly for a distance and then bent downwardly as indicated at 357, terminating in a bend or hook 358. The last bell crank lever on the front side of the front channel 53 has an upwardly extending arm $54^b$ not connected to the bar 64 but connected to the front end of a bar 359 which extends rearwardly. A pin 360 on arm $54^b$ normally seats in a notch 361 in the upper side of bar 356, and a spring $358^a$ connects bar 358 with the part 357, normally holding the notch 361 in bar 356 in position to receive the pin 360. A disk 362 lies on the part 60 of the last rod 58 mounted on the front channel a spring 363 surrounding the spring 61 around said rod and lying between the disk and the upper flange of the channel. A foot 364 attached to the lower end of said part 60 on said last rod takes the place of the caster block 62 and roller 63 of the other assemblies.

The rear end of bar 359 is pivotally connected to a vertical arm 365 of a bell crank lever pivotally mounted at 366 on the front side of the front channel 11. The other arm $365^a$ of the lever extends forwardly and has pivotal connection to the upper end of a vertical bar 367 to the lower end of which a block 368 is secured having a wedge shaped lower portion, the edge of which lies longitudinally of the machine. A link 369 interposed between the lower part of bar 367 and one of two retaining bars 370, the use of which will later appear, serves to hold the lower part of the block and bar to which it is attached from aimless movement.

A foot member 371 secured at the lower end of a vertical bar 372 is located at the rear end and on the rear side of the front channel 10, the bar having vertical slots 373 therein through which pins 374 on the channel project. The foot member is normally held in a lower position by a spring 375 attached at its lower end to the lower pin 374 and at its upper end to a pin 376 on the bar 372. A bell-crank lever having an upper arm 377 is pivotally mounted at 378 on the channel adjacent the bar 372 and has a short lower arm 379 projecting under a pin 380 on the bar. A bar 381 provided with a longitudinal slot 382 is pivotally connected to the upper end of arm 377, the slot receiving the upper pin 374 as shown. A bell-crank latch lever having a vertical arm 383 is pivotally mounted on the front side of the front channel 11 at 384 and has a horizontal arm 385 extending rearwardly to which a spring 386 is connected the same normally holding the vertical arm 383 against a pin 387 projecting from channel 11. The upper end of arm 383 is directly back of the rear end of bar 381, as shown in Figs. 37 and 39.

A shaft 388 is mounted in suitable supporting bearings on and above the front channel 11 (see Fig. 44). From this shaft at a plurality of spaced points in its length divided arms 389 extend forwardly between the divisions of which blocks 390 are pivotally mounted. A rod 391 passes loosely through each block and has nuts threaded thereon at its upper end, the lower ends of the rods having enlarged heads pivotally mounted at 392 to vertically movable members 393, a series of which are mounted in alinement in front of the front rear channel 11 and pivotally linked together by pivots $393^a$. Said members are retained in place by the retaining bars 370, heretofore described. Springs 394 are located one around each rod 391 between the lower head thereof and the upper block 390 through which the rod passes.

A lever is mounted at the front end of shaft 388 having a downwardly extending arm 395 and an upwardly extending arm 396 to the upper end of which the front end of a link 397 is connected. At its rear end the link is connected to the upper end of a lever 398 which is loosely mounted between its ends on a shaft 399 located above and paralleling cam shaft 325. A roller 400 is carried at the lower end of lever 398 and is adapted to bear against a cam 401 mounted on shaft 325. This cam has a recess $401^a$ in which roller 400 normally rests when the shaft is at rest it being held therein and against the cam when rotating by a spring 402 acting on the link 397 as shown in Fig. 38. The rotation of the cam moves the lower end 395 of the lever on shaft 388 back to the dotted line position shown in Fig. 38 where it is retained by arm 385 with the clamping members 393 held in downward position. A pin 403 extends forwardly from the hub of the lever made of arms 395 and 396 above the hooked end 358 of bar 356 and on the rocking of shaft 388 its downward movement serves to engage it with the end 358 and turn bar 356 downwardly disengaging it from the pin 360.

A plurality of spaced apart pressure bars 404 are mounted vertically on the rear side of the rear channel 11 between the channel and a retaining bar 405, links 404$^a$ connecting each bar 404 with the retaining bar. The bars 404 are normally forced in a downward direction by springs 406, one for each bar and connected to pins 407 at their upper ends on the bars and to pins 408 on the channel at their lower ends, as shown in Fig. 53. A shaft 409 parallels the shaft 388 above and slightly back of the rear channel 11 on which a plurality of collars 410 are keyed, each having a forwardly extending finger 411 which enters an opening made in the upper end of an associated pressure bar 404. An arm 412 is secured to and extends upwardly from the shaft 409 to which one end of a link 413 is pivotally connected, the opposite rear end having similar attachment to the upper end of a lever 414 loosely mounted between its ends on shaft 399 and carrying a roller 415 at its lower end which bears against a cam 416 on cam shaft 325. The lower end of each bar 404 is fashioned with a head having an inclined front end as shown at 404$^b$ whereby as the first board A traverses the machine and comes to the lower ends of the bars 404, it rides under the same, elevating the bars by engaging against the inclined portions 404$^b$, the bars bearing against the upper side of the board with spring pressure after the board has passed thereunder.

The table at the rear end of the machine is divided into a plurality of sections 212$^a$ (see Fig. 54), separated by transverse slots 417. Between the front and rear edges of the table sections, the same are grooved transversely as indicated at 418, all of the grooves being in alinement longitudinally of the machine, and back of the groove 418 a plurality of narrower and shallower grooves are made paralleling each other and the groove 418 to form ribs 419 as shown in Fig. 54. The rear board as it passes on to the table has its grooved front edge to which glue has been applied located directly over the groove 418 and any glue which may separate therefrom drops into the groove.

Figure 1:
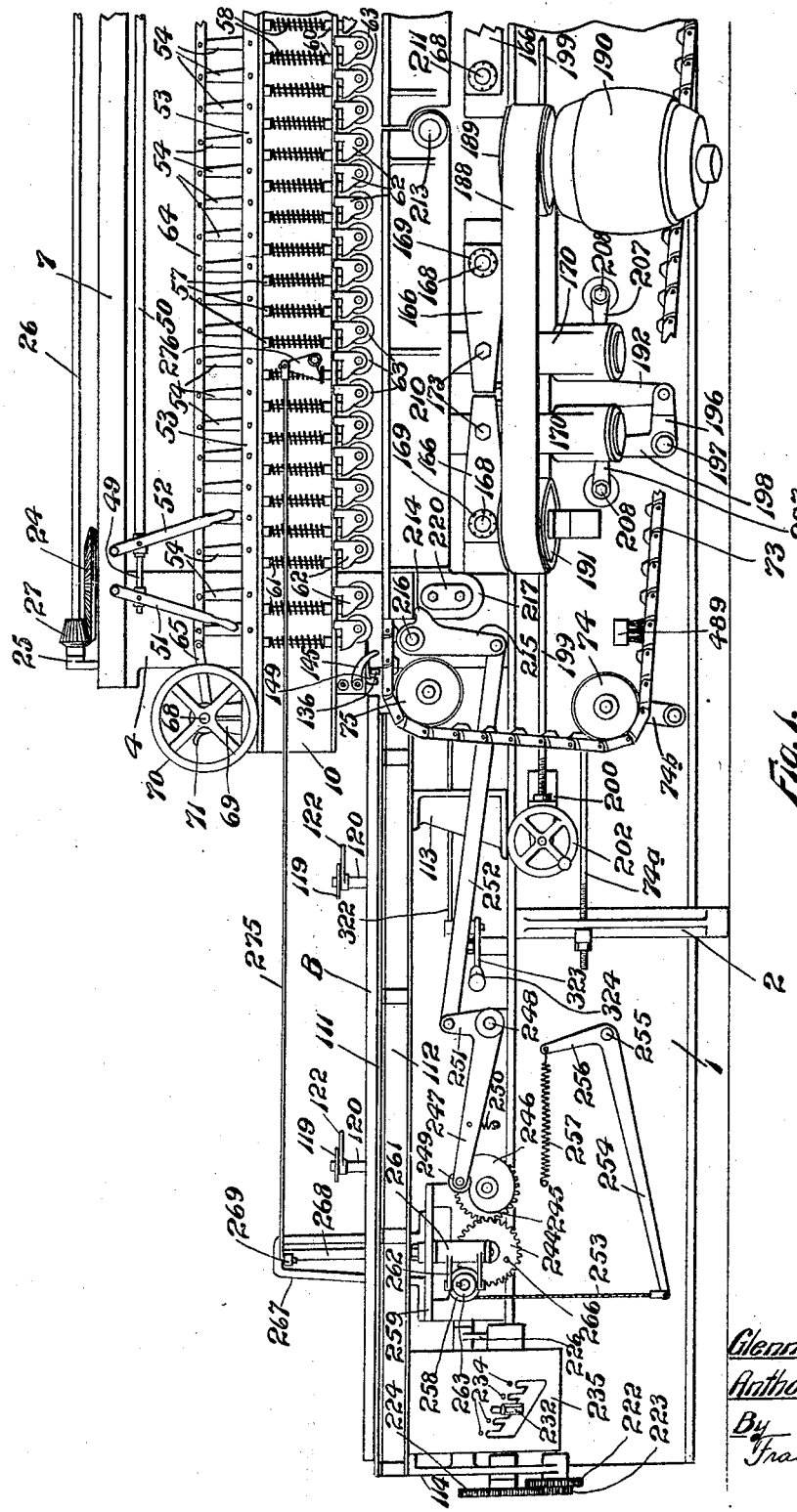
Figure 2:
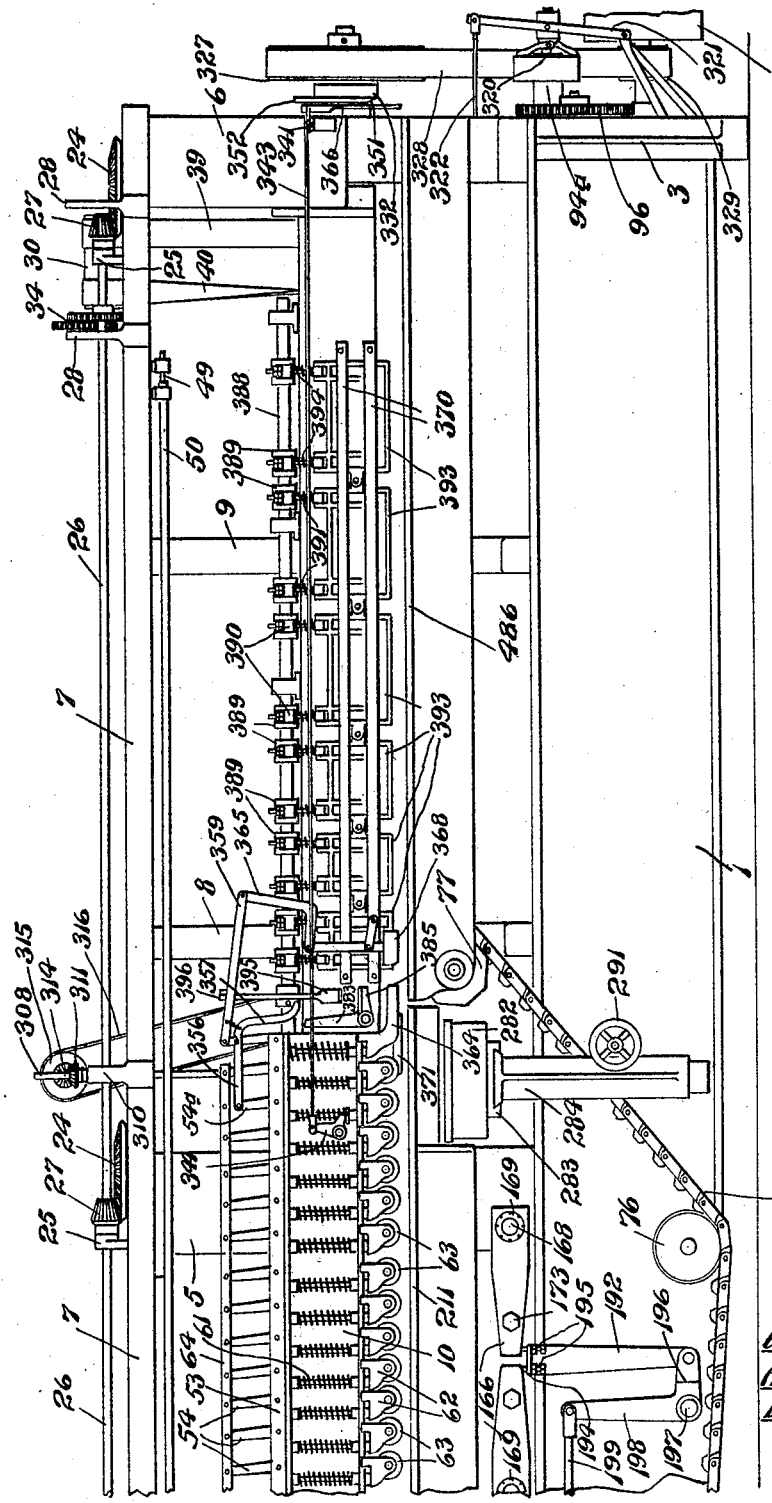
Fig. 2 is a similar elevation of the rear half of the machine.
Figure 3:
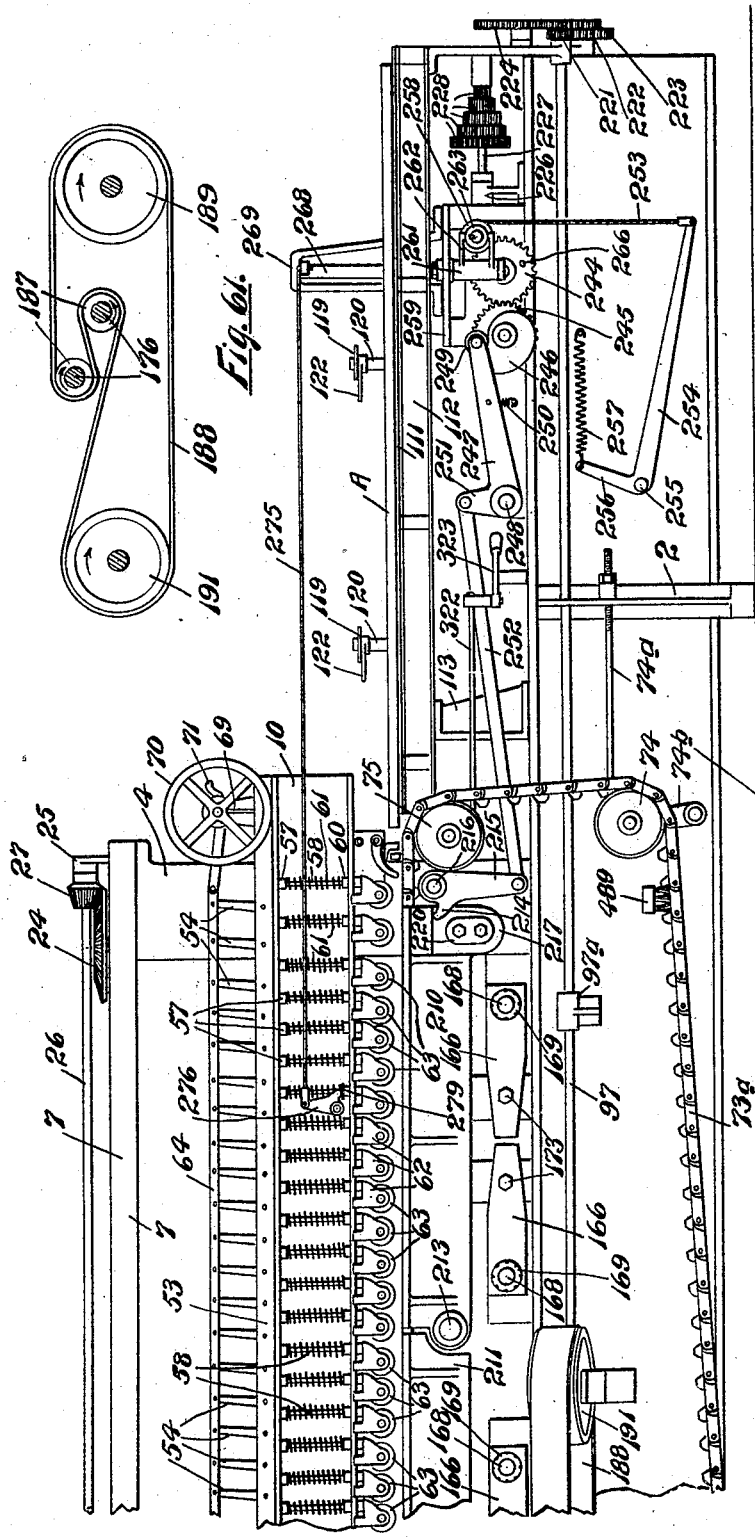
Fig. 3 is a rear elevation of the forward half of the machine.
Figure 4:
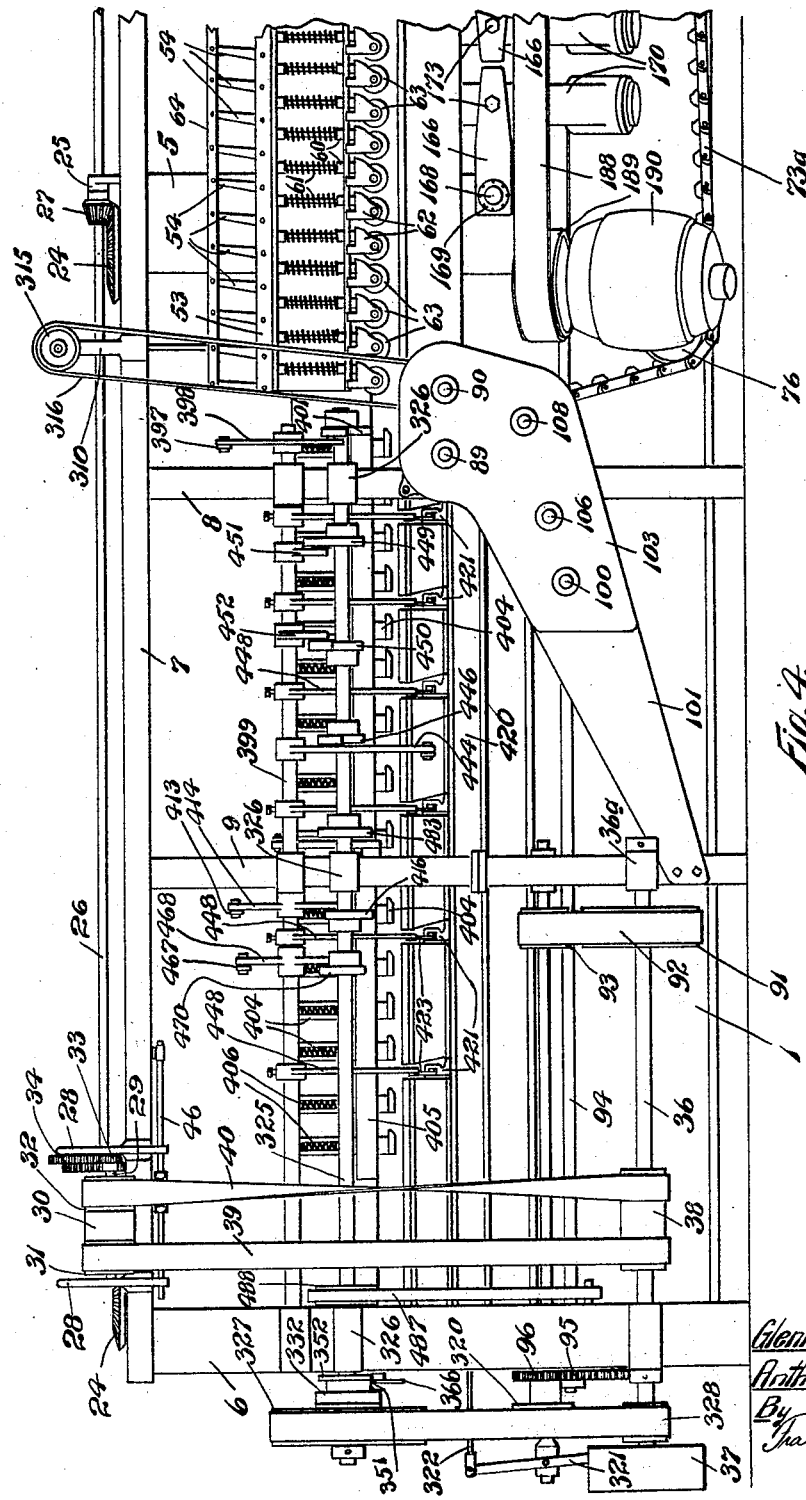
Fig. 4 is a similar elevation of the rear half of the machine.

The table sections 212$^a$ are supported at their front and rear ends by supports 420 which lie longitudinally of and at the rear end of the machine, as shown in Figs. 44, 45 and 4. A number of guide bars 421 located in spaced parallel relation transversely of the machine are carried by the supports 420 and are formed with guide grooves 422 in one side thereof in which the horizontal flange of an angle bar 423 is received and mounted on rollers 424 carried by bars 425 making an anti-friction mount for the angle bars. A retaining plate 426 attached to each guide bar serves to hold the angle bars in the grooves. A shaft 427 passes through the vertical flange of each angle member 423 and also through intermediate plates 428 disposed between the angle members. The angle members and guides therefor are located under alternate slots 417 in the table and the plates 428 under the intermediate slots as shown in Fig. 46. On shaft 427 adjacent each plate 428 and each vertical flange of each angle member 423 a triangular member 429 is secured, the shaft passing through a rear lower corner thereof. A similar member 430 is pivotally mounted at 431 at the lower rear corner of the member on each plate 428 and member 423 in front of the member 429. A link 432 connects the upper corners of each pair of members 429 and 430. Posts 433 and 434 are connected at their lower ends to the front lower corners of members 429 and 430, extending vertically therefrom. A gripper bar 435 is disposed between the upper ends and connected to posts 433 and 434. Said gripper bars lie directly within the slots 417 and in normal position are below the upper surfaces of table sections 212$^a$. The front ends of the plates 428 and angle members 423 are all permanently attached to an angle bar 436.

Two rock shafts 437 and 438 are rotatably mounted in spaced parallel relation in bearing blocks 438$^a$ on the under sides of guide bars 421. An arm 439 is secured to and extends upwardly from each arm for a short distance and have pivotal connection at their upper ends to the vertical flange of an angle bar 440. An arm 441 is secured to shaft 427 and carries a roller 442 at its end which rides on the horizontal flange of said angle 440. A link rod 443 is pivotally connected at its front end to the rear end of the angle 440 and at its rear end to the lower end of a lever 444 loosely mounted at its upper end on shaft 399 and equipped between its ends with a roller 445 which bears against a cam 446 on cam shaft 325. The rotation of the cam shaft gives a reciprocation to link 443 and the connected angle 440, whereupon the angle is at the same time elevated, turning shaft 427 rotatively to the rear and elevating the front lower corners of all of the members 429 and 430 with a consequent elevation of all of the gripper bars 435 above the upper surfaces of the table sections 212$^a$, as is obvious.

A link 447 is connected at its front end to the rear end of each member 423, the opposite ends of the links having connection to arms 448 fixed on shaft 399. Two cams 449 and 450 are secured on the cam shaft 325, two arms 451 and 452 being fixed at one end on shaft 399 and carrying rollers 453 and 454 which ride on the cams, serving to positively rock the shaft 399 and give a reciprocatory movement to all of the members 423. On the forward movement of members 423 and connected plates 428, the gripper bar mechanism is moved bodily forward as a whole, all of the gripper bars moving simultaneously, and this forward movement is timed to occur immediately following the elevation of the gripper bars 435.

Cooperating upper gripper fingers 455 formed at their front ends with downwardly turned pointed board engaging tips 456 are pivotally mounted at their rear ends at 457 on posts 458 which extend vertically from adjacent the rear ends of the angle members 423. Springs 459 act to normally draw the fingers in a downward direction. These gripper fingers move with the angle members 423 in their reciprocatory movements as is obvious.

Each finger 455, adjacent its front end is provided with a roller 460 adapted to ride on the horizontal flange 461 of an angle member, a plurality of which, one for each gripper finger are located below and across the lower edges of the channels 11. To the vertical flanges 462 of said members, vertical bars 463 are secured at their lower ends, the same extending upwardly between channels 11 and each having pivotal connection at its upper end with a forwardly extending arm 464 keyed on a shaft 465 mounted for rocking movements between shafts 388 and 409. An arm 466 is secured to and extends upwardly from shaft 465 to the upper end of which the front end of a link bar 467 is pivotally connected, the same at its rear end having similar connection to the upper end of a lever 468 loosely mounted on shaft 399. At its lower end, lever 468 carries a roller 469 held against a cam 470 on cam shaft 325 by a spring 471 attached to link 467 and a shaft 472 lying back of and paralleling shaft 409.

A plurality of arms 473, one for each angle member 461 are fixed at their upper ends to shaft 472. To the lower end of each arm 473 an ejecting or kicker finger 474 is pivotally connected at its rear end, being formed at its front end with a head 476 having a vertical front face. A roller 475 is mounted at the front end of each finger 474 and rides on the flange 461 of its associated angle member, the head 476 being located a short distance ahead of the end of the associated gripper finger 455, roller 475 being located ahead of roller 460. An arm 477 keyed to shaft 472 depends therefrom and has pivotal connection at its lower end with a link 478, similarly connected at its rear end with the upper end of an arm 479 pivotally mounted at 480 on the support 9. Arm 479 has an integral rear extension 481 carrying a roller 482 which bears against a cam 483 on cam shaft 325, being held thereagainst by spring 484 as shown in Fig. 50. In the normal upper position of the gripper tips 456 and ejector heads 476, the same are above the upper surfaces of the boards passing through the machine. The gripper and ejector fingers are held from disengagement from their respective angle members by retaining plates 485 as shown in Fig. 37, the same being connected to the channels 11.

In front of the sectional table comprised of sections 212ª a delivery table 486 is located attached to the front support 420 and with a space between the two tables at their upper parts. A friction brake 487 acts continuously on a drum 488 on the cam shaft 325 to prevent overthrow of the shaft, and the chains 73 and 73ª are continuously brushed by brushes 489 supplied with lubricant to lubricate the chains in their running.

The operation may be outlined as follows: The first board A entered into the machine at the rear side of the machine is carried to the rear end of the machine by the rear chain 73ª, and a tapered groove cut in its front edge as fully described previously. The board is forced under the presser bars 404 riding under the inclines 404ᵇ thereon and it is retained in position by said bars after it has passed from the chain 73ª. It will be noted (see Fig. 25), that one end of each of the blocks 83 in the feed chains is normally held above the upper edges of the chain links, springs 86 causing this, yet the blocks are readily forced down under the board placed above them. At the end of the board, however, one of the blocks 84 is against the board and serves to force it to travel with the chain, remaining frictionally in contact with the end of the board until pins 85 draw the said block down as the link on which it is mounted turns in a downward direction around the drive pulley 77. The path of movement of the block 83 thus held up by a frictional contact with the end of the board is indicated by the upper circular dotted line in Fig. 25. The succeeding blocks 83 take the lower circular dotted line of travel and the board has been carried far enough that the later succeeding blocks do not touch the end of the board.

The next board B which must be fed into the machine at the front follows at least a certain distance behind the first board by virtue of the feed control mechanism shown in Figs. 7 to 14 inclusive, and previously described. This distance is necessary in order to give the machine time to shift the first board forward into position for joining engagement with the second board B. The second board has a tapered tongue cut on its rear edge, as fully outlined previously as it passes toward the rear joining table.

The instant that the end of board B reaches the rear trip roller, elevating the same and operating trip lever 344, the cam shaft 325 is turned through one complete operation. At the initiation of the movement or at the time rod 58ᵃ is lifted, the bell-crank lever attached to its sleeve 57 is operated, arm 54ᵃ moving toward the rear end of the machine, thereby giving a longitudinal movement to bar 356 which, engaging with pin 360, serves to move bar 359 longitudinally and thereby lift the guide member 368 above its normal position, through actuation of the bell-crank lever 365. This guide member 368 is retained in upper position for a short time only as the rocking of shaft 388 on rotation of the cam shaft 325 through the means shown in Fig. 38, causes pin 403 to engage with and depress the end 358 of bar 356, disconnecting the bar from pin 360 and freeing the guide member 368 for return to normal lower position under the influence of the inner spring 61 on the last rod 58, as shown in Fig. 37. The pressure guide member 368 is raised long enough, however that it is out of the way and does not interfere with the ejectment of two joined boards from the machine such as must periodically occur when the machine is running continuously.

The rear chain 73ᵃ carries the first board A to the position indicated in dotted lines at the right of Fig. 6. For the board to join with the next front board B coming through the machine, it is necessary that it be set over so that the groove in its front edge shall be alined with the tongue on the rear edge of board B. Inasmuch as the first board A has been held against the table by presser bars 404, these must be lifted immediately prior to the set over of lateral shift of said board. The rotation of the cam shaft brings cam 416 into operation, rocking shaft 409 with a consequent elevation of the presser bars 404. Board A is thus freed for movement. Immediately following roller 469 drops off of the cam 470 and all of the angle members carrying the front ends of the gripper and ejecting fingers are lowered, the gripper tips at 456 striking the upper surface of the board A a certain and exact distance back of the front edge thereof, while the ejector heads 476 drop to a position in front of the front edge of the rear board A but back of any boards which may have previously joined in the machine. In Fig. 45, the relative positions of the parts are shown immediately prior to the raising of the bars 404 and lowering of the gripper and ejector fingers. Substantially simultaneously with the dropping of the gripper fingers on to the board A, gripper bars 435 are elevated against the under side of the board by the action of cam 446 and its associated mechanism. As soon as the board is raised above the table and engaged by the upper gripper fingers the angle slides 423 are carried forward by cam 450 and mechanism associatd therewith, and at the same time or slightly before cam 483 acts to move all of the ejector fingers forward. This affects the shift of the board A from the rear position shown in Fig. 45 to front joining position shown in Fig. 44, and simultaneously there is an ejectment of any boards which may have been joined together on the previous cycle of the machine. During the shifting and ejecting movements the clamping members 393, as well as the guide member 368 must be elevated and out of the way. As soon, however, as the shift is accomplished, cam 401 will have operated to rock shaft 388 to force the clamping members 393 to lower position and against the upper side of the board A, clamping it against the table and holding it securely against movement. These clamping members will remain in operative position until the board B joining with board A passes by the foot 371, inasmuch as the latch lever arm 385 has held the shaft 388 from returning to its original position on completion of the rotation of the cam shaft. When the board B has passed by the foot 371, the attached bar 372 is pulled down by spring 375, pin 380 acting to turn the bell-crank lever associated therewith, this giving a quick impulse to the bar 381 in the direction indicated by the arrow in Fig. 39, the end of the bar striking against arm 383 with a hammer blow, thereby disassociating arm 385 from the lower arm 395 with a consequent freeing and lifting of the clamping members 393. This freeing of the rear board A occurs exactly at the time the ends of boards A and B come into alinement. The longer chain 73 which has been feeding board B to the rear thereupon carries both boards longitudinally a short distance farther as is evident. It is of course understood that the gripper and ejector fingers are drawn back to normal position immediately after accomplishing their function, the gripper bars being likewise lowered and the angle slides 423 and plates 428 carrying the same being returned in the same time substantially. The presser foot 364 and presser guide 368 hold the board B down firmly against the table during the joining operation, the front chain 73 carrying both boards after joining beyond the rear end of said presser foot so that the joined boards may be entirely free for ejectment with the raising of the clamping members 393 and guide 368. It is evident that board A, by reason of its being a prescribed distance ahead of board B in passing through the machine, is always in position to be shifted laterally by the time the end of board B reaches position to trip the mechanism for actuating the cam shaft 325. Irrespective of the width of the boards A, the front edges thereof, after shifting, are always in the same exact relative position with respect to the machine, due to the engagement of tips 456 at an exact and prescribed distance back of the front edge of each board.

This machine for joining lumber takes any length of boards within the limits of the capacity of the machine. The boards A fed into the rear side of the machine may be of different widths while the boards B may be either single boards or a plurality of boards which have been previously joined together, no obstruction to the projection of wide boards in front of the machine being interposed anywhere in the length thereof. A very rapid joining of the boards may be accomplished. The adjustment for different thicknesses of lumber is very simple, the elevation of the entire upper mechanism mounted on channels 10 and 11 taking place at the same time and effected through power operation, while the cutters may be properly adjusted for different board thicknesses by turning hand wheel 202. The mechanism for accomplishing the cutting of tapered tongues and grooves on the edges of the board with relatively stationary cutters is a particularly valuable feature of the invention. The machine in every respect is practical and operative and has proven its merit in operation.

Many changes in minor detail of construction in a machine of this character may be made without departing from the invention. The appended claims define the invention and we consider ourselves entitled to all forms of construction coming within the scope of such claims.

We claim:

1. In a lumber joining machine having two sets of cutters for forming interfitting dove-tailed tongues and grooves on the edges of two lengths of lumber, means for feeding said lengths of lumber past the cutters and into engagement with each other, means for moving the lengths of lumber with respect to the cutters to form tapered tongues and grooves thereon, and means for applying glue to the edges of the lengths of lumber on which the tongues and grooves are cut.

2. A lumber joining machine having two sets of cutters for forming interfitting dove-tailed tongues and grooves on the edges of two boards, means for feeding said lengths of lumber past the cutters and into engagement with each other, means for automatically and progressively moving the boards with respect to the first set of cutters from the beginning of the action of the cutters thereon whereby the boards are progressively tilted and tapered tongues and grooves formed thereon, and means for applying glue to the grooved and tongued edges of said boards.

3. A lumber joining machine having two sets of cutters for forming interfitting tongues and grooves on the edges of boards fed through the machine, means for feeding said boards through the machine past the cutters, and means for moving the boards with respect to the cutters to form the grooves and tongues thereon wider at one end than at the other and progressively tapered from one end to the other.

4. A lumber joining machine having means for feeding two boards through the machine, relatively stationary cutters for forming interfitting tongue and groove at the edges of the boards, means for inserting the tongue on one board into the groove in the other board, and means for moving the boards with respect to the cutters to form the tongue and groove wider at one end than at the other and progressively tapered from one end thereof to the other.

5. A lumber joining machine comprising means for cutting longitudinal tapering grooves on the adjacent edges of two boards fed through the machine in the same direction, means for applying glue to said edges, means for shifting one board into position to be joined by the other board, and means for controlling the entrance of the second board into the machine until the first board has reached a predetermined position therein.

6. A lumber joining machine having two sets of relatively stationary cutters therein for forming interfitting tongues and grooves on the adjacent edges of two pieces of lumber fed through the machine, means for carrying the pieces of lumber past the cutters, means for progressively tilting the pieces with respect to the cutters to thereby cause tapered tongues and grooves to be cut thereon, means for applying glue to the tongued and grooved edges of said pieces, and means for automatically setting said tilting means in motion substantially at the time said pieces of lumber reach the cutters.

7. A lumber joining machine having two sets of relatively stationary cutters for forming interfitting tongues and grooves on the adjacent edges of two pieces of lumber fed through the machine, means for carrying the pieces past the cutters and into engagement with each other, means for moving the pieces relative to the cutters as they are fed past the same to form tapered tongues and grooves, means for automatically setting said moving means in operation substantially as the pieces reach the first set of cutters, means for automatically stopping said moving means and returning it to original position after a predetermined operation thereof, and means for applying glue to the tongued and grooved edges of the pieces.

8. A lumber joining machine having means for feeding two pieces of lumber therethrough from the same end of the machine, means for setting one piece over a predetermined distance after it is fed through the machine, means for cutting interfitting tongues and grooves on the adjacent edges of the pieces as they are fed through the machine whereby, after the first piece is set over, the second piece joins therewith, the tongue and groove thereon engaging each other, means for applying glue to the tongued and grooved edges of the pieces, and means for moving the pieces relative to the cutters as they are fed past said cutters to cut said tongues and grooves with a progressive longitudinal taper.

9. A lumber joining machine having cutters for forming interfitting dovetails on the edges of two pieces of lumber, means for feeding said pieces past the cutters and into engagement with each other, two tilting tables over which said pieces pass, said tables being pivotally mounted, means for turning the tables about their pivots as the pieces of lumber pass thereover, and means for applying glue to the dovetails on said pieces prior to their engagement.

10. A lumber joining machine having cutters for forming interfitting dovetails on the edges of two pieces of lumber, means for feeding said pieces past the cutters and into engagement with each other, two tilting tables over which said pieces pass, means for tilting said tables about their pivots as the pieces of lumber pass thereover, means to automatically set the tilting means in operation substantially as the pieces reach the cutters, and means for applying glue to the dovetails on said pieces prior to their engagement.

11. A lumber joining machine having cutters for forming interfitting dovetails on the adjacent edges of two pieces of lumber fed through the machine, means for feeding said pieces past the cutters and into engagement with each other, a table over which each piece passes pivotally mounted at one end, means for progressively elevating the free end of the table made automatically operable as its piece of lumber passing thereover reaches the cutter acting thereon, means for limiting the pivotal movement of each table and stopping the same after a predetermined movement thereof, means for returning the tables to original position, and means for applying glue to the dovetails on the pieces of lumber prior to their engagement.

12. A lumber joining machine having cutters for forming interfitting dovetails on the adjacent edges of two pieces of lumber fed through the machine, means for feeding said pieces past the cutters one ahead of the other, means for setting the first piece fed through over into proper position for engagement of the dovetails on the two pieces when the second piece is fed through, means for progressively moving each piece of lumber with respect to the cutter acting thereon to form tapering dovetails, and means for applying glue to the dovetails prior to their engagement with each other.

13. A lumber joining machine including cutting means for forming one portion of an interfitting dovetail joint longitudinally of and at one edge of a piece of lumber, said cutting means being mounted in a relatively stationary mounting, and means for continuously and progressively varying the position of the piece of lumber as it passes the cutting means to thereby taper said dovetail from one end thereof to the other.

14. A lumber joining machine including cutting means for forming one portion of an interfitting dovetail joint longitudinally of and at one edge of a piece of lumber, said cutting means being mounted in a relatively stationary mounting, means for continuously and progressively varying the position of the piece of lumber as it passes the cutting means to thereby taper said dovetail from one end thereof to the other, and means to automatically set said last mentioned means in operation as the piece of lumber begins to pass by the cutting means.

15. A lumber joining machine including rotary cutters mounted in a relatively stationary mounting for cutting one portion of an interfitting dovetail joint longitudinally of and at one edge of a piece of lumber, a table over which the piece passes for operation thereon by the cutters, means for carrying the piece over the table past the cutters, and means for tilting the table about one end thereof beginning when the piece of lumber reaches the cutters and continuing with uniform movement while the piece is passing the cutters.

16. A lumber joining machine including rotory cutters mounted in a relatively stationary mounting for cutting one portion of an interfitting dovetail joint longitudinally of and at one edge of a piece of lumber, a table pivotally mounted at one end over which the piece of lumber is passed, means for carrying the piece of lumber past the cutters, a lever pivotally mounted adjacent the free end of the table and having a projecting portion engaging under the end of the table, and means to swing the lever on its pivot uniformly to thereby elevate the table about its pivot while the piece of lumber is acted upon by the cutters.

17. A lumber joining machine including rotary cutters mounted in a relatively stationary mounting for cutting one portion of an interfitting dovetail joint longitudinally of and at one edge of a piece of lumber, a table pivotally mounted at one end over which the piece of lumber is passed, means for carrying the piece of lumber past the cutters, a lever pivotally mounted adjacent the free end of the table and having a projecting portion engaging under the free end of the table, a rotatably mounted cam, and mechanism operated by said cam and connected to said lever for turning the same uniformly about its pivot to elevate the table about its pivot as the piece of lumber is fed by the cutters.

18. A lumber joining machine containing the elements in combination defined in claim 17, combined with means for automatically starting the cam in rotation as the piece of lumber reaches the cutters.

19. A lumber joining machine containing the elements in combination defined in claim 17, combined with means for automatically starting the cam in rotation as the piece of lumber reaches the cutters, and means for automatically stopping the rotation of the cam after it has moved a predetermined distance.

20. A lumber joining machine containing the elements in combination defined in claim 17, combined with means for automatically starting the cam in rotation as the piece of lumber reaches the cutters, means for automatically stopping the cam after it has moved a predetermined distance, and means for returning said cam to original position after its movement is stopped.

21. A lumber joining machine including two sets of rotary cutters, each mounted in a relatively stationary mounting, said cutters being adapted to cut interfitting dovetails on the adjacent edges of two pieces of lumber fed through the machine, means for feeding the pieces of lumber past the cutters, two tables pivotally mounted at one end over which the pieces pass, one over each table, movable means supporting the free ends of the tables and operable to turn the tables about their pivots, means for operating each of said movable means normally at rest, and means rendered effective by the pieces of lumber as they pass through the machine to start said operating means in motion, said operating means becoming effective substantially as a piece of lumber comes to the first of its respective cutters.

22. A lumber joining machine including front and rear rotary cutters, each mounted in a relatively stationary mounting, and adapted to cut one portion of an interfitting dovetail joint longitudinally of and at one edge of a piece of lumber, a table pivotally mounted at one end over which the piece of lumber is passed, means for carrying the piece of lumber past the cutters, a lever pivotally mounted adjacent the free end of the table and having a projecting portion engaging under the free end of the table, a rotatably mounted cam, a pivotally mounted bell-crank lever, a roller at one end of one arm of the lever bearing on the cam, a link connecting the other arm of the bell-crank lever with the lower end of the first lever, and means rendered effective by the passage of the piece of lumber over the table for driving the cam.

23. A lumber joining machine including rotary cutters mounted on relatively stationary mountings and adapted to cut one portion of an interfitting dovetail joint longitudinally of and at one edge of a piece of lumber, means for carrying said piece of lumber past the cutters, means movably mounted adjacent the carrying means over which the piece passes, and means for moving said movably mounted means to change the position of the piece of lumber relative to the cutters as the piece passes by the cutters and cut said dovetail joint portion with a lengthwise taper from one end thereof to the other.

24. A lumber joining machine including rotary cutters mounted on relatively stationary mountings and adapted to cut one portion of an interfitting dovetail joint longitudinally of and at one edge of a piece of lumber, means for carrying the piece past the cutters, a movably mounted member pivotally mounted at one end over which the piece passes, means movably mounted under and supporting the free end of said member, a shaft, means to drive the same, means normally disconnected from the shaft and connected with said movably mounted means for moving the same to turn the member about its pivot, and trip means operated by the piece of lumber for connecting said shaft with said normally disconnected means to thereby turn the member about its pivot as the piece of lumber is going past the cutters.

25. A lumber joining machine including rotary cutters adapted to cut one portion of an interfitting dovetail joint longitudinally of and at one edge of a piece of lumber, means for carrying the piece past the cutters, a table pivotally mounted at one end over which the piece of lumber passes, a lever pivotally mounted adjacent the free end of the table and supporting the same whereby on pivotal movement of the lever the table is moved about its pivot, a shaft, means to drive the same, a clutch member splined on the shaft, a combined coacting clutch member, collar and gear loose on the shaft, a rotatably mounted cam, means connected with the lever and operated by the rotation of the cam for turning said lever to tilt the table about its pivot, gearing connections between the gear and cam, and means for automatically engaging the clutch members as the piece of lumber reaches the cutters in its movement through the machine.

26. A construction containing the elements in combination defined in claim 25 combined with means for automatically disconnecting the clutch members after a predetermined rotative movement of the cam.

27. A construction containing the elements in combination defined in claim 25, combined with means for automatically disconnecting the clutch members after a predetermined rotative movement of the cam, a flexible member attached to the collar and wound around the same during the rotation of the cam, and spring means connected with the flexible member for unwinding the same and returning the cam and associated parts to original position after disconnection of the clutch members.

28. A construction containing the elements in combination defined in claim 25, combined with means for automatically disconnecting the clutch members after a predetermined rotative movement of the cam, a flexible member attached to the collar and wound around the same during the rotation of the cam, a pivotally mounted bell-crank lever to the end of one arm of which an end of the flexible member is connected, and a spring connected to the other arm of the lever.

29. A construction containing the elements in combination defined in claim 25, combined with means for driving the shaft at a plurality of different speeds with the piece of lumber carried through the machine at the same speed.

30. A lumber joining machine including rotary cutters adapted to cut one portion of an interfitting dovetail joint longitudinally of and at one edge of a piece of lumber, chains for carrying the piece past the cutters, a table pivotally mounted at one end over which the chain carries the piece, a lever pivotally mounted adjacent the free end of the table and supporting the same whereby on pivotal movement of the lever the table is moved about its pivot, a shaft, a second shaft, means to drive the chain from the second shaft, means to drive the first shaft from the second shaft at a plurality of speeds, a clutch member splined on the shaft, a combined coacting clutch member, collar and gear loosely mounted on the first shaft, gears driven by the first gear, a cam movable with one of said gears, means connected with the lever and operated by the rotation of the cam for turning said lever to turn the table about its pivot, and means for automatically engaging the clutch members as the piece of lumber reaches the cutters in its movement over the table.

31. A lumber joining machine including rotary cutters adapted to cut one portion of an interfitting dovetail joint longitudinally of and at one edge of a piece of lumber, an endless chain for carrying the piece of lumber past the cutters, a table pivotally mounted at one end over which the chain carries the piece, a lever pivotally mounted adjacent the free end of the table and supporting the same and having means whereby on pivotal movement of the lever, the table is turned about its pivot, a shaft, means to drive the same at different speeds, a clutch member splined on the shaft, a combined coacting clutch member, collar and gear loosely mounted on the shaft, a second gear driven by the first gear, a third gear driven by the second gear, a cam movable with the third gear, means connected with the lever and operated by the rotation of the cam for turning the lever about its pivot, a pin projecting from the second gear, a pivotally mounted yoke member connected with the splined clutch member, means for automatically operating said yoke member to throw the clutch members into engagement when the piece of lumber reaches the cutters, and means on the yoke member located in the path of movement of said pin on the second gear and operable by said pin to turn the yoke member and disengage the clutch members after a predetermined rotative movement of said cam.

32. A lumber joining machine including cutters adapted to cut one portion of an interfitting dovetail joint longitudinally of and at one edge of a piece of lumber, an endless chain for carrying the piece past the cutters, pressure rollers for pressing the piece into engagement with the chain, a pivotally mounted table over which the piece passes, a trip operated by the passage of the piece under one of the pressure rollers, and mechanism, normally at rest, but rendered active through the operation of the trip for turning the table about its pivot and thereby continuously changing the position of the piece of lumber with respect to the cutters to cut the dovetail thereon with a longitudinal taper from one end to the other.

33. A lumber joining machine including cutters adapted to cut one portion of an interfitting dovetail joint longitudinally of and at one edge of a piece of lumber, an endless chain for carrying the piece past the cutters, pressure rollers located in spaced relation over the chain and yieldingly pressing the piece against the chain, a table over which the piece is carried, said table being pivotally mounted at one end, movably mounted means supporting the other end of the table and movable to turn the table about its pivot, a shaft, means to drive the same, mechanism on the shaft and driven thereby but normally disconnected therefrom, means interposed between said mechanism and said table supporting means for operating said supporting means through the mechanism, and trip means for connecting said mechanism to the shaft, said trip means being associated with and operable by the elevation of one of the pressure rollers as the piece of lumber passes thereunder.

34. A lumber joining machine containing the elements in combination defined in claim 33, combined with means for automatically disconnecting said mechanism from the shaft after a predetermined cycle of movement of said mechanism.

35. A lumber joining machine containing the elements in combination defined in claim 33, combined with means for automatically disconnecting the mechanism from the shaft after a predetermined cycle of movement of the mechanism, and means for automatically returning the mechanism to its original position immediately following its disconnection from the shaft.

36. A lumber joining machine having rotary cutters for cutting interfitting dovetails in the adjacent edges of two pieces of lumber fed through the machine, two chains for carrying the pieces past the cutters, two tables, each pivotally mounted at one end over which the pieces are carried, one piece over each table, two pivotally mounted levers, one at the free end of each lever and each having means for supporting the free end of the table to turn the same about its pivot on turning the lever about its pivot, a shaft, means for driving the same, a clutch member splined on each end of the shaft, a combined coacting clutch member, collar and gear loosely mounted adjacent each end of the shaft, mechanism driven by each gear and operatively associated with each lever for turning said lever about its pivot, two trip mechanisms, one for each carrying chain, and means for operating each trip mechanism by the passage of a board or piece of lumber under the same, each trip mechanism being operatively connected with a splined clutch member to move it into engagement with its associated clutch member on operation of the trip mechanism.

37. In combination, a support, front and rear tables pivotally mounted at one end on the support and normally located horizontal, two pivotally mounted levers, one at each free end of each table on which said free end of the table rests, said levers on pivotal movement thereof serving to turn the tables about their pivots, an endless carrying chain running over each table and adapted to carry a piece of lumber thereover, a drive shaft, means to drive the chains from said shaft, a second shaft, means for driving the second shaft from the drive shaft at any one of a plurality of different speeds, two mechanisms, one for each table normally disconnected from the second shaft but adapted to be driven thereby, each mechanism being operatively associated with a lever to turn it about its pivot, and two trip mechanisms, one for each table and first mentioned mechanisms for connecting said mechanisms to the second shaft, each trip mechanism being operated by the passage of a piece of lumber to and under the same, and cutters to which the pieces of lumber are carried.

38. A construction containing the elements in combination defined in claim 37 combined with means associated with each of said first mechanisms for automatically disconnecting the same from the second shaft after the completion of a predetermined cycle of movement thereof.

39. A construction containing the elements in combination defined in claim 37, combined with means associated with each of said first mechanisms for automatically disconnecting the same from the second shaft after the completion of a predetermined cycle of movement thereof, and means for returning each mechanism to original position on disconnection thereof from the second shaft.

40. The method of cutting a longitudinally tapered dovetail lengthwise of a piece of lumber which consists in continuously changing the position of the piece relative to the cutter.

41. The method of cutting a longitudinally tapered tongue or groove lengthwise of a piece of lumber which consists in continuously changing the position of the piece relative to the tongue or groove forming cutters as the piece is moved past the cutters.

42. A lumber joining machine comprising a support, carrying chains for carrying pieces of lumber over the support, supporting beams mounted over and lengthwise of the support, a plurality of pressure members mounted on the beams over the carrying chains, a drive shaft, means for raising or lowering said beams and attached pressure members relative to the support, and means for operating said means from the drive shaft.

43. A lumber joining machine comprising a relatively fixed support having tables located substantially horizontal lengthwise thereof, endless carrying chains for carrying pieces of lumber over the tables, presser members for bearing against said pieces of lumber on their upper sides as they are carried over the tables, supporting means for the presser members mounted adjustably on the support and adapted to be vertically adjusted to different positions, a power shaft, means for raising or lowering the supporting means, and means for selectively connecting said raising or lowering means with the power shaft.

44. A lumber joining machine comprising a supporting frame including an upper horizontal beam, vertical screws rotatably mounted on and passing through said beam, beams paralleling said upper beam and located below the same, means on said second beams through which the screws thread, board pressing and shifting mechanisms mounted on the second beams, relatively stationary tables carried by the supporting frames below said mechanisms, a power shaft, and means for driving all of the screws from said power shaft to change the position of said second beams and the mechanisms carried thereby relative to the tables below.

45. A lumber joining machine comprising a supporting frame including an upper horizontal beam, vertical screws rotatably mounted on and passing through said beam at spaced intervals, beams paralleling the upper beam and located below the same, means on said second beams through which the screws thread, board pressing and shifting mechanisms mounted on the second beams, tables carried by the supporting frame below said mechanisms, gears attached to the upper ends of the screws, a shaft located lengthwise of the upper beam, gears thereon meshing with the first gears, a power shaft, means interposed between the power shaft and the first shaft for driving said first shaft in either direction from the power shaft, and means for selectively connecting said power shaft with said interposed means to drive said first shaft in either direction.

46. A lumber joining machine comprising a supporting frame including an upper horizontal beam, spaced apart vertical screws rotatably mounted on and passing through said upper beam, beams paralleling said upper beam and located below the same, means connected with said second beams through which the screws thread, board engaging mechanisms mounted on the second beams, board supporting elements located below the second beams, gears connected to the upper ends of the screws, a shaft mounted on and lengthwise of the upper beam, gears thereon meshing with the first gears, a power shaft mounted on the support, a counter shaft carried by the upper beam, gearing connections between the counter shaft and the first shaft, two loose pulleys on the counter shaft, belts driven by the power shaft passing around the loose pulleys and driving said pulleys in opposite directions, a fixed pulley on the counter shaft, and means for selectively shifting either belt to the fixed pulley.

47. A construction containing the elements in combination defined in claim 46, in which said last mentioned means comprises two levers pivotally mounted between their ends on the upper beam, two rods to which one end of each lever is pivotally connected, a shifting fork on each rod engaging with a belt, and two operating members connected one to the opposite end of each lever.

48. A construction containing the elements in combination defined in claim 46, in which said last mentioned means comprises two levers pivotally mounted between their ends on said upper beam, two rods to one end of each of which one end of a lever is pivotally connected, a shifting fork on each rod engaging with a belt, a rod and a sleeve located lengthwise of the beam and having pivotal connection at one end each to the opposite end of a lever, said rod passing through the sleeve, and to operating levers pivotally connected to the upper beam to which the front ends of the rod and sleeve are pivotally connected.

49. In a lumber joining machine, a substantially horizontal table, means movable over the table for carrying a piece of lumber thereover, a channel located lengthwise of and over the table, a plurality of vertical rods passing in spaced apart relation through the flanges of the channel, rollers mounted on the lower ends of the rods, a sleeve around each rod adjacent its upper end, nuts threaded on to the upper end of the rods against the sleeves, springs around the rods acting to normally force the same downwardly to bring the rollers against the upper side of a piece of lumber carried over the table, a pivotally mounted bell-crank lever connected to each sleeve at the end of one arm of the lever, a bar connecting the other arms of all of said levers, a link attached to one end of the bar, a short shaft, a disk secured on one end of the shaft, a pin set off center on the disk to which the link is pivotally connected, said link extending beyond the pin and being bent upwardly and then curved slightly downwardly, and a second pin set off center on the disk adapted to engage under the link and under the curved end of the link in two different positions, and an operating hand wheel on the shaft.

50. In a lumber joining machine, a fixed supporting beam, two cutter frames pivotally mounted on said support and extending toward each other, a bell-crank lever pivotally mounted on the beam, a bar connected to one arm of the lever and coming under the adjacent sides of the cutter frames, said sides of the frames being supported by said bar, and means to turn the bell-crank lever about its pivot.

51. In a lumber joining machine, a fixed supporting beam, two cutter frames pivotally mounted on said support and extending toward each other, a bar mounted vertically on the support, its upper end coming under the adjacent sides of the cutter frames, a bell-crank lever pivotally mounted on the support having a horizontal arm pivotally connected to the lower end of the bar and a vertical arm, a rod attached to the vertical arm, means for moving said rod longitudinally, and means on the upper end of said bar on which the adjacent sides of the cutter frames rest.

52. A construction containing the elements in combination defined in claim 51, combined with a cutter spindle support pivotally mounted to turn about a horizontal axis between the sides of each cutter frame, and an arm pivotally mounted on the supporting beam, one for each spindle support, and loosely connected to the lower end of said spindle support.

53. In a lumber joining machine, a fixed supporting beam, two cutter frames pivotally mounted on said support and extending toward each other, a bell-crank lever pivotally mounted on the beam having a vertical and a horizontal arm, a vertical bar pivotally connected at its lower end to the horizontal arm, said bar at its upper end coming under the adjacent sides of the cutter frames and supporting the same, cutter spindle supports carried one by each frame, a rotary spindle mounted in each spindle support, a cutter head carrying cutters fixed at the upper end of each spindle, a horizontal rod connected to the vertical arm of the bell-crank lever, and means for moving said rod lengthwise.

54. In a lumber joining machine, a fixed supporting beam, two cutter frames pivotally mounted on horizontal axes on said beam and extending toward each other, a bell crank lever pivotally mounted on the support, a bar pivotally connected at one end to one arm of the lever and at its other end coming under the adjacent sides of the frames, said sides resting on the bar, a rod attached to the other arm of the lever, a bracket on the beam through which the rod passes, a gear theaded on to the end of the rod, and means to turn the gear to give longitudinal movement to the rod to elevate the cutter frames about their pivots.

55. In a lumber joining machine, two separate carrying means for carrying pieces of lumber through the machine, means for preventing successive entrance of pieces of lumber on to the same carrying means, and means for rendering said prevention means ineffective by entrance onto and carrying of a piece of lumber on the other carrying means.

56. In a lumber joining machine, front and rear carrying means for carrying pieces of lumber through the machine, means for preventing entrance of a piece of lumber on to the front carrying means prior to the entrance of a piece of lumber on to the rear carrying means, and means for preventing entrance of a second piece of lumber on to the rear carrying means until after a piece has been entered on to the front carrying means.

57. In a lumber joining machine, front and rear endless chains mounted to carry pieces of lumber through the machine from the same end of the machine, a post located between the chains at the front portion thereof, means mounted on the post for preventing entrance of a piece of lumber into the machine on to the front chain until after entrance of a piece of lumber into the machine on to the rear chain, and means for preventing entrance of a piece of lumber on to the rear chain until after a piece of lumber has been entered into the machine on the front chain.

58. In a lumber joining machine, front and rear endless carriers for carrying pieces of lumber through the machine, and from the same end of the machine, means for preventing the entrance of a piece into the machine and on to the front carrier until after a piece has been entered on to the rear carrier, and preventing other than alternate entrance of the pieces thereafter on to the two carriers.

59. In a lumber joining machine, front and rear endless carriers for carrying pieces of lumber through the machine from the same end of the machine, means normally stopping entrance of a piece of lumber into the machine on to the front carrier, and means operated by the passage of a piece of lumber through the machine over the rear carrier for rendering said stop means ineffective and a second stop means effective to prevent entrance of a second piece of lumber on to the rear carrier.

60. In a lumber joining machine, front and rear endless carriers for carrying pieces of lumber through the machine from the same end of the machine, means for preventing entrance of a piece of lumber into the machine first on the front carrier, means operated by the passage of a piece of lumber through the machine on the rear carrier for rendering said stop means ineffective, and additional stop means rendered effective by the entrance of said piece of lumber on to the rear carrier and carrying of the same a short distance for preventing entrance of a piece of lumber on to the front carrier until the end of the first piece of lumber has passed a predetermined point in the machine.

61. In a lumber joining machine, front and rear carriers for carrying pieces of lumber through the machine from the same end of the machine, a post between the carriers adjacent their front portions, a shaft passing through the post from its front to its rear end, upwardly extending arms attached to the shaft, and a bar attached to each arm, the bar at the rear of the post normally extending beyond the rear side of the post over the rear carrier, and at the front of the post extending toward the front carrier but normally located behind the same.

62. In a lumber joining machine, front and rear carriers for carrying pieces of lumber through the machine from the front end of the machine, a post between the front portions of the carriers, a shaft passing through the post from and paralleling the length of the machine, an upwardly extending arm fixed on each end of the shaft, one at the rear end of the post and the other at the front end of the post, an additional arm pivotally mounted on both the front and rear end of the post and paralleling the other arms, a bar pivotally connected to the upper ends of the rear arms and having a part adapted to extend over the rear carrier, said part being bent toward the rear end of the machine, a sleeve pivotally connected to the first arm on the front of the post, a rod passing through the sleeve, a stop block connected to the second arm on the front of the post, said rod being attached to the block, a spring around the rod between the block and sleeve, and a nut threaded on to the end of the rod against the sleeve.

63. A construction containing the elements in combination defined in claim 62, combined with a tension spring attached at one end to the stop block and at its other end to the post.

64. In a lumber joining machine, front and rear carriers for carrying pieces of lumber through the machine from the front to the rear end of the machine, a post disposed between the carriers at their front portions, two shafts disposed one over the other in front of the post, the lower shaft at its front end having a rearwardly extending finger curved rearwardly and downwardly and at its rear end carrying a rearwardly extending finger turned slightly upwardly at its rear end, and the upper shaft at its front end having a rearwardly extending finger and at its rear end an upwardly extending arm, two trip bars pivotally connected to the post on the front and rear sides thereof, each having a catch shoulder on its lower side and each extending rearwardly over the respective carriers, a rod connecting said arm and rear trip bar at a point above its pivot, a stop lever pivotally mounted between its ends on the front side of the post and formed at its rear end with an upturned dog to engage with the catch shoulder on the front trip bar, a pin projecting from said lever under which the end of the finger on the upper shaft passes, and a second irregularly shaped stop lever pivotally mounted between its ends on the rear side of the post and likewise formed at its rear end with an upturned dog to engage with the catch shoulder on the rear trip bar, said lever also having an upwardly and forwardly extending projection coming over the rear end of the finger at the rear end of the lower shaft, all substantially as and for the purposes described.

65. In a lumber joining machine, cutters for cutting interfitting dovetails on the front and rear edges of pieces of lumber fed through the machine at the rear and front sides thereof, respectively, means for applying glue to said dovetails, a table on to which the piece fed through the rear portion of the machine is carried, means for gripping said piece of lumber both above and below the same and carrying it laterally a predetermined distance to locate its dovetail in position to receive and join with the dovetail on the piece fed through the front portion of the machine, and means for carrying the pieces of lumber through the machine and past the cutters.

66. In a lumber joining machine, cutters for cutting interfitting dovetails on the front and rear edges of pieces of lumber carried through the machine at the rear and front sides thereof, respectively, means for applying glue to the dovetails, a table on to which the piece carried through the rear portion of the machine is carried, pressure bars under which the piece is forced, means for gripping said piece of lumber above and below and carrying it laterally over the table a predetermined distance to locate its dovetail in position to join with the dovetail on the succeeding piece carried through the front portion of the machine, means for automatically elevating said pressure bars prior to the lateral movement of the first piece, and separate carriers for carrying the pieces through the rear and front parts of the machine and past the cutters.

67. A construction containing the elements in combination defined in claim 66, combined with means for clamping the first laterally moved piece against movement after it has been moved to such position.

68. A construction containing the elements in combination defined in claim 67, combined with means for clamping the laterally moved piece of lumber against movement after it has been moved to position and during the time that the succeeding piece is joining therewith, and means for releasing said clamping means after completion of the joining of the dovetails on the pieces.

69. A construction containing the elements in combination defined in claim 66, combined with means for clamping the laterally moved piece of lumber against movement after it has been moved to position and during the time that the succeeding piece is joining therewith, means for releasing said clamping means after completion of the joining of the pieces, and means to eject the joined pieces of lumber in a forward direction from the machine.

70. In a lumber joining machine, cutters for cutting interfitting dovetails on the front and rear edges of pieces of lumber carried through the machine at the rear and front sides thereof, means for carrying the pieces of lumber past the cutters, means for applying glue to the dovetails, means for moving one piece of lumber first fed through the machine laterally into position that its dovetail will join with the dovetail on the succeeding piece of lumber fed through the machine, means for clamping the first piece of lumber against movement after it is in position to join with the second piece and during the time that the joining of the pieces takes place, and means for laterally ejecting the pieces of lumber after joining thereof, said ejectment occurring substantially simultaneously with the lateral movement of a succeeding first piece of lumber in a succeeding cycle of the machine.

71. In a lumber joining machine, front and rear carriers for carrying front and rear pieces of lumber through the machine, cutters for cutting interfitting dovetails on the front and rear edges of the rear and front pieces, respectively, means for applying glue to the dovetails, means for compelling the feeding of the rear piece first through the machine, a table onto which said piece is delivered, means for elevating the piece above the table, means for carrying said piece laterally after elevation a predetermined distance and then lowering the same, means for clamping the piece against movement and in position for joining of the front piece therewith, and means for releasing the clamping means after the pieces are joined together.

72. In a lumber joining machine, front and rear carriers for carrying front and rear pieces of lumber through the machine, cutters for cutting interfitting tongue and groove at the approximate edges of the pieces of lumber, means for applying glue thereto, a table on to which the rear piece of lumber is carried, spring actuated presser bars located in spaced apart vertical relation over the table and under which the rear board is forced, means for moving said rear piece laterally a predetermined distance and into position for the engagement of the pieces of lumber when the front piece is carried through the machine, and means for raising all of the presser bars momentarily immediately prior to the lateral movement of the rear piece of lumber to free the same for such forward movement.

73. In a lumber joining machine, front and rear carriers for carrying front and rear pieces of lumber through the machine, cutters for cutting interfitting tongue and groove at the approximate edges of the pieces of lumber, means for applying glue thereto, a table on to which the rear piece of lumber is carried, spring actuated presser bars located in spaced apart vertical relation over the table and under which the rear board is forced, a rock shaft rotatably mounted above the presser bars, fingers extending from the rock shaft and engaging one with each presser bar, means for moving said rear piece of lumber laterally a predetermined distance and into position for the engagement of the pieces of lumber when the front piece is carried through the machine, and means for rocking said rock shaft to raise all of the presser bars momentarily during the time that the rear piece of lumber is moved.

74. In a lumber joining machine, front and rear carriers for carrying front and rear pieces of lumber through the machine, cutters for cutting interfitting dovetails on the rear and front edges of the front and rear pieces of lumber, respectively, means for applying glue to the dovetails, a table on to which the rear piece of lumber is carried, spring actuated presser bars located in spaced apart vertical relation over the table and under which the rear board is forced, a rock shaft rotatably mounted adjacent the upper ends of the presser bars, means connecting each presser bar to the rock shaft, a cam shaft rotatably mounted on the machine, means for automatically rotating the cam shaft through one revolution as a front piece of lumber approaches the table, means operated by the cam shaft for moving the rear piece of lumber laterally into position for the engagement of the dovetails on said piece and the approaching front piece of lumber, a cam on the cam shaft, and means interposed between said cam and the rock shaft for rocking the shaft by the cam to elevate the presser bars immediately prior to the lateral movement of the rear piece of lumber.

75. In a lumber joining machine, front and rear carriers for carrying front and rear pieces of lumber through the machine, cutters for cutting interfitting dovetails on the front and rear edges of the rear and front pieces of lumber, yielding means under which the rear piece is forced by its carrier, a table against which the rear piece is pressed by said means, means for moving said rear piece laterally a predetermined distance, means for lifting said yielding pressing means from said piece immediately prior to said lateral movement, and clamping means operated against the rear piece after it has been moved laterally to hold it against movement while joining with the front piece of lumber.

76. In a lumber joining machine, the elements in combination defined in claim 75, combined with means for engaging against the upper side of the rear piece and clamping it against the table as soon as said rear board is moved laterally to position.

77. In a lumber joining machine, front and rear carriers for carrying pieces of lumber through the machine, means for cutting interfitting dove tails in the front and rear edges of the rear and front pieces of lumber, a table on to which the rear piece of lumber is moved by the rear carrier, means for moving said rear piece of lumber laterally a predetermined distance after it has reached the table, a shaft rotatably mounted over and lengthwise of the table, clamping members connected with the shaft for upward or downward movements on rocking of the shaft, means to rock the shaft to force the clamping members against the upper side of said rear piece of lumber immediately after it has been moved laterally and means for holding said shaft in such position during the time that the front piece is being moved into engagement with the rear piece of lumber.

78. In a lumber joining machine, front and rear carriers for carrying front and rear pieces of lumber through the machine, means for cutting interfitting dove tails in the front and rear edges of the rear and front pieces, respectively, a table onto which the rear piece is first moved by the rear carrier, means for moving said rear piece laterally over the table a predetermined distance, a rock shaft rotatably mounted over and lengthwise of the table, arms extending from the shaft, vertically movable clamping members connected with the arms and normally located above the table, means automatically rendered operable by the movement of the front piece of lumber toward the table for rocking said shaft to carry the clamping members against the rear piece of lumber after its lateral movement has taken place, latch means associated with the rock shaft for holding it with the clamping members in clamping position, and means for releasing said latch means under which the front piece passes, and freed for operation by the passage of said front piece therefrom.

79. In a lumber joining machine, front and rear carriers for carrying front and rear pieces of lumber through the machine, means for cutting interfitting dove tails at the front and rear edges of the rear and front pieces of lumber, respectively, means for applying glue to said dove tails, a table on to which the rear piece is first moved by the rear carrier, means for bodily moving said rear piece laterally over the table a predetermined distance, a rock shaft rotatably mounted over and lengthwise of the table, arms extending therefrom, clamping members attached to the arms and movable vertically when the shaft is rocked, a cam shaft on the machine, means for automatically turning said cam shaft one revolution on approach of the front piece of lumber to the table, a cam on the cam shaft, means connected with the rock shaft and operated by the cam for rocking the shaft on rotation of the cam shaft and forcing the clamping members against the upper side of said rear piece of lumber after it has been moved laterally, latch means for holding the rock shaft with the clamping members in clamping position, said latch means including a pivotally mounted lever, a foot member located at the front end of the table under which the front piece of lumber passes, said foot dropping as said piece passes from thereunder, and means operated by the dropping of the foot member for striking the lever and unlatching the rock shaft for return to normal position with an elevation of the clamping members.

80. In a lumber joining machine, front and rear carriers for carrying front and rear pieces of lumber through the machine, means for cutting interfitting dovetails on the front and rear edges of the rear and front pieces of lumber, respectively, a table on to which the rear piece of lumber is first moved by the rear carrier, a cam shaft mounted above and lengthwise of the table, pressure means under which the rear piece is forced as it is moved on to the table, driving means, means for automatically connecting said driving means to the cam shaft operated by the front piece of lumber as it approaches the table, means for automatically disengaging the driving means when the cam shaft has made one revolution, means operated by the cam shaft for raising the pressure means, means operated by the cam shaft for elevating the rear piece of lumber above the table, means operated by the cam shaft for moving said rear piece laterally a predetermined distance, clamping means normally elevated above the table, means operated by the cam shaft for moving said clamping means downwardly against the rear piece of lumber after it has been moved laterally, latch means for holding the clamping means in clamping position, and means under which the front piece of lumber passes and released with the passage of said front piece thereunder for disengaging the latch means and free the clamping means for upward movement to normal position.

81. In a lumber joining machine, the combination of elements defined in claim 81, combined with ejecting means operated by the cam shaft for moving any two pieces of lumber previously joined in the machine laterally ahead of the lateral movement of said rear piece of lumber.

82. In a lumber joining machine, a table transversely slotted at a plurality of spaced apart points, means for carrying a piece of lumber having a dovetail cut longitudinally thereof on its forward edge to the table, transfer bars mounted below the table one at each slot, means for elevating the transfer bars in unison, means for moving said bars forward a predetermined distance, gripper fingers mounted over the table and normally held above the piece of lumber, means for lowering said fingers to said piece of lumber, said fingers being carried by and movable forward with the means moving the transfer bars forward, and means for retracting the bars and fingers to original position and moving them back to initial position.

83. A construction containing the elements in combination defined in claim 83, combined with means for carrying a second piece of lumber to the table in front of the first piece, said second piece having a cooperating dovetail cut lengthwise thereof at its rear edge whereby said dovetails have interfitting engagement, and means to hold the first piece against movement as the second piece is joined therewith.

84. A construction containing the elements in combination defined in claim 83, combined with means for carrying a second piece of lumber to the table in front of the first piece, said second piece having a cooperating dovetail cut lengthwise thereof at its rear edge and adapted to interfit with the dovetail on the first piece, means to hold the first piece against movement as the second piece is joined therewith, means to release said holding means and means for moving the two joined pieces laterally out of the machine on the next lateral movement to a succeeding rear piece of lumber carried to the table.

85. In a lumber joining machine a table transversely slotted at a plurality of spaced apart points, means for carrying a piece of lumber having a dovetail cut longitudinally thereof and at its front edge on to the table, supporting means mounted lengthwise of and above the table, transfer bars mounted below the table one at each slot, a carriage on which the transfer bars are movably mounted, a plurality of gripper fingers pivotally mounted on the carriage and extending over the table, means for moving all of the transfer bars in unison upwardly through the slots against the under side of the piece of lumber, means for lowering the gripper fingers against the upper side of the piece of lumber, means for reciprocating the carriage to carry the piece of lumber laterally a predetermined distance and thereafter return the carriage to original position, means for returning the transfer bars and gripper fingers to original position prior to the return of the carriage, and means for carrying a second piece of lumber lengthwise on to the table and join it with the first piece of lumber, said second piece having an interfitting dovetail cut longitudinally thereof and at its rear edge.

86. A construction containing the elements in combination defined in claim 85, combined with a plurality of ejecting fingers mounted above the table, each having an ejecting head depending in front of the front edge of the first piece of lumber, said ejecting fingers being supported by and lowered by the same means supporting and lowering the gripper fingers, and means for reciprocating the ejecting fingers ahead of the gripper fingers.

87. A lumber joining machine comprising a table transversely slotted at a plurality of points, a carriage mounted for movement beneath and transverse of the table, a shaft extending through the carriage parallel with the length of the table, triangular shaped members fixed on the shaft below each slot in the table, said shaft passing through said members at the lower rear corner thereof, similar members pivotally mounted on the carriage at similar corners in front of the first members, bars connecting the upper corners of said members, each bar connecting a pair of said members, posts extending upwardly from the lower front corners of said members, transfer bars connected to the upper ends of the posts, one bar for each slot, means for rocking the shaft to elevate the transfer bars through the slots, and means to reciprocate the carriage.

88. A construction containing the elements in combination defined in claim 87, in which said means for rocking the shaft comprises an arm attached to the shaft, a bar having a flat upper side, a roller on the free end of the arm riding on said upper side of the bar, rocker arms positioned below the bar, pivotally connected thereto at their upper ends and pivotally mounted at their lower ends, a rod attached to the bar, a lever pivotally mounted at its upper end and to which the rod has connection, a cam shaft rotatably mounted between the ends of the lever, and a cam thereon for swinging the lever about its pivot on rotation of the cam shaft.

89. A lumber joining machine comprising a table onto which pieces of lumber may be carried, a longitudinal support above the table, a shaft rotatably carried by the support, a plurality of arms extending from the shaft, a vertical bar attached to each arm and extending below the support, a horizontal bar attached to the lower end of each vertical bar, a gripper finger and an ejector finger supported at their front ends on each horizontal bar, means to rock the shaft to lower all of the horizontal bars, means for reciprocating the fingers, and means for elevating the horizontal bars after forward movement of the fingers.

90. In a lumber joining machine, front and rear endless chains for carrying front and rear pieces of lumber through the machine, means for cutting interfitting dovetails on the front and rear edges of the rear and front pieces of lumber, means for compelling the carrying of a rear piece of lumber first through the machine, a table onto which said piece of lumber is delivered, means tripped by the front piece of lumber as it comes thereto for raising the rear piece above the table, moving it laterally a predetermined distance and then clamping it to the table, and means operated and released by the passage of the front piece past it for releasing the clamping means when the ends of the pieces are in alinement.

91. In a lumber joining machine, front and rear endless chains for carrying front and rear pieces of lumber through the machine, means for cutting interfitting dovetails on the front and rear edges of the rear and front pieces of lumber, a table onto which the rear piece of lumber is delivered, rear clamping means for holding the piece of lumber against the table, means for compelling the carrying of the rear piece of lumber first through the machine, means tripped by the second piece of lumber as it comes thereto shortly before it reaches the table for raising the rear piece of lumber above the table, releasing the clamping means prior to raising the piece, moving the piece laterally a predetermined distance, lowering it to the table, setting a second clamping means against the piece to again clamp it to the table and eject any previously joined two pieces of lumber from the table, and means released by the passage of the front piece of lumber past it for releasing said second clamping means when the ends of the two pieces are in alinement.

92. In a lumber joining machine, means for carrying a piece of lumber through the rear portion of the machine and onto a table, means for cutting a dovetail in the front edge thereof as it is passing through the machine, means for carrying a second piece of lumber through the machine at the front portion thereof, means for stopping entrance of the second piece into the machine until the last end of the first piece is a predetermined distance ahead of the first end of the second piece, means for cutting an interfitting dovetail in the rear edge of the second piece, means, normally at rest, for engaging with the first piece at a predetermined distance back of the front edge thereof and moving it forward a predetermined distance so that its dovetail alines with the dovetail of the approaching second piece, means tripped by the first end of the second piece of lumber as it comes thereto for setting said engaging and moving means in motion, means, normally inoperative, for clamping the first piece of lumber against movement after it has been moved forward, said means likewise being rendered operative by the same trip means, and means automatically releasing the clamping means when the dovetails are engaged together.

In testimony whereof we affix our signatures.

GLENN H. DICKERSON.
ANTHONY VANDERVELD.